(12) United States Patent
Durham et al.

(10) Patent No.: US 11,693,754 B2
(45) Date of Patent: *Jul. 4, 2023

(54) AGGREGATE GHASH-BASED MESSAGE AUTHENTICATION CODE (MAC) OVER MULTIPLE CACHELINES WITH INCREMENTAL UPDATES

(71) Applicant: Intel Corporation, Santa Clara, CA (US)

(72) Inventors: David M. Durham, Beaverton, OR (US); Karanvir S. Grewal, Hillsboro, OR (US); Sergej Deutsch, Hillsboro, OR (US); Michael E. Kounavis, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,557

(22) Filed: Mar. 3, 2022

(65) Prior Publication Data

US 2022/0222158 A1 Jul. 14, 2022

Related U.S. Application Data

(63) Continuation of application No. 16/902,755, filed on Jun. 16, 2020, now Pat. No. 11,301,344.

(51) Int. Cl.
*G06F 11/27* (2006.01)
*G06F 7/72* (2006.01)
(Continued)

(52) U.S. Cl.
CPC .............. *G06F 11/27* (2013.01); *G06F 7/724* (2013.01); *G06F 11/0772* (2013.01);
(Continued)

(58) Field of Classification Search
CPC ...... G06F 11/27; G06F 7/724; G06F 11/0772; G06F 11/1068; G06F 11/1435;
(Continued)

(56) References Cited

U.S. PATENT DOCUMENTS 8,826,035 B2 9/2014 Durham et al.
9,251,097 B1 2/2016 Kumar et al.
(Continued)

FOREIGN PATENT DOCUMENTS

CN 113806134 A 12/2021
EP 3926476 A1 12/2021

OTHER PUBLICATIONS

Kounavis et al. "The MAGIC Mode for Simultaneously Supporting Encryption, Message Authentication and Error Correction," Apr. 1, 2020, pp. 1-77.
(Continued)

*Primary Examiner* — Kyle Vallecillo
(74) *Attorney, Agent, or Firm* — Jaffery Watson Mendonsa & Hamilton LLP

(57) ABSTRACT

Embodiments are directed to aggregate GHASH-based message authentication code (MAC) over multiple cachelines with incremental updates. An embodiment of a system includes a controller comprising circuitry, the controller to generate an error correction code for a memory line, the memory line comprising a plurality of first data blocks, generate a metadata block corresponding to the memory line, the metadata block comprising the error correction code for the memory line and at least one metadata bit, generate an aggregate GHASH corresponding to a region of memory comprising a cacheline set comprising at least the memory line, encode the first data blocks and the metadata block, encrypt the aggregate GHASH as an aggregate message authentication code (AMAC), provide the encoded first data
(Continued)

blocks and the encoded metadata block for storage on a memory module comprising the memory line, and provide the AMAC for storage on a device separate from the memory module.

25 Claims, 13 Drawing Sheets

(51) Int. Cl.

| | |
|---|---|
| *G06F 11/07* | (2006.01) |
| *G06F 11/10* | (2006.01) |
| *G06F 11/14* | (2006.01) |
| *G06F 11/30* | (2006.01) |
| *G06F 12/14* | (2006.01) |
| *H04L 9/06* | (2006.01) |
| *H04L 9/08* | (2006.01) |
| *H04L 9/32* | (2006.01) |

(52) U.S. Cl.
CPC ...... *G06F 11/1068* (2013.01); *G06F 11/1435* (2013.01); *G06F 11/3037* (2013.01); *G06F 12/1408* (2013.01); *H04L 9/0637* (2013.01); *H04L 9/0643* (2013.01); *H04L 9/085* (2013.01); *H04L 9/3242* (2013.01)

(58) Field of Classification Search
CPC ............. G06F 11/3037; G06F 12/1408; H04L 9/0637; H04L 9/0643; H04L 9/085; H04L 9/3242
See application file for complete search history.

(56) References Cited

U.S. PATENT DOCUMENTS

| | | | |
|---|---|---|---|
| 9,904,788 | B2 | 2/2018 | Kumar et al. |
| 10,540,297 | B2 | 1/2020 | Saileshwar et al. |
| 10,678,636 | B2 | 6/2020 | Durham |
| 11,301,344 | B2 | 4/2022 | Durham et al. |
| 2019/0042359 | A1 | 2/2019 | Durham |
| 2019/0042369 | A1 | 2/2019 | Deutsch et al. |
| 2019/0043600 | A1* | 2/2019 | Saileshwar ......... G06F 12/1408 |
| 2019/0220349 | A1 | 7/2019 | Deutsch et al. |
| 2019/0229925 | A1 | 7/2019 | Kounavis et al. |
| 2020/0119903 | A1* | 4/2020 | Thomas ................ H04L 9/0637 |
| 2021/0390024 | A1 | 12/2021 | Durham et al. |

OTHER PUBLICATIONS

European Patent Application No. 20211320.5, "Extended European Search Report" dated May 14, 2021, 8 pages.

* cited by examiner

400

Generate an error correction code for a memory line comprising a plurality of data blocks, wherein the error correction code comprises parity bits generated based on first portions of the plurality of data blocks of the memory line
410

Generate a metadata block corresponding to the memory line, wherein the metadata block comprises the error correction code for the memory line and at least one metadata bit
420

Encode the data blocks and the metadata block
430

Generate an aggregate GHASH corresponding to at least one region of the plurality of data blocks
440

Encrypt the generated aggregate GHASH as an AMAC for the at least one region
450

Provide the encoded data blocks and the encoded metadata block for storage on a memory module
460

Provide the AMAC for storage on a device separate from the memory module
470

Identify a set of encoded data blocks associated with a memory line from a set of storage memory devices in a memory module and an encoded data block correction from a management memory device in the memory module, the set of encoded data blocks including one encoded data block for each storage memory device in the set of storage memory devices
510

Determine a set of decoded data blocks comprising the memory line from the set of encoded data blocks and a decoded data block correction from the encoded block correction
520

Combine the set of decoded data blocks into a validation block correction at least in part via an exclusive or (XOR) operator
530

Compare the decoded data blocks and the validation block correction to identify one or more bit errors in the memory line when the decoded block correction and the validation block correction are different 540

Correct the identified one or more bit errors in the memory line using the decoded data block correction 550

Bit errors associated with entire device failure? 560

YES → Identify AMAC corresponding to a region comprising the failed device 570 → Utilize AMAC to verify integrity of corrected bit errors 580

NO → Utilize decoded data block correction to verify integrity of corrected bit errors 590

Identify a first plurality of AMAC values computed on the data blocks of a second plurality of memory regions
511

Verify the integrity of each of the second plurality of the memory regions using a corresponding AMAC value from the first plurality of AMAC values 521

Is more than one integrity test failing? 531

NO → Is exactly one integrity test failing? 541

YES → STOP; There are uncorrectable errors 532

NO → RETURN; No errors 552

YES → Identify the AMAC value and memory region of the failing integrity test 542

For a third plurality of memory cache lines compute a fourth plurality of encoded data block correction values 551

Perform an integrity test for each of the memory cache lines of the third plurality of the memory cache lines using a corresponding encoded data block correction value from the fourth plurality of encoded data block correction values 561

Does each integrity test indicate single block failure where all failed blocks are of the same index as the AMAC value upon which the single failed integrity test 531 is performed? 571

NO → STOP; There is no device failure; Perform single block recovery using an encoded data block correction value from the fourth plurality of encoded data block correction values of 551 572

YES → There is full device failure. Perform full device recovery using at least one encoded data block correction value from the fourth plurality of encoded data block correction values of 551 581

Utilize an AMAC value from the first plurality of AMAC values of 511 to verify the integrity of corrected bit errors 591

For a first plurality of data bytes stored in memory compute a second plurality of AMAC values where each of the AMAC values is computed on the same first plurality of data bytes and each of the AMAC values is computed on a different set of secret parameters $H_{i,j}$ 515

Form a hypothesis about the presence of errors in locations of as many encoded data blocks as the number of AMAC values computed in 515, where encoded data blocks include bytes from the first plurality of data bytes 515 525

From the hypothesis of 525 form a system of as many bit-linear equations as the number of AMAC values computed in 515, where the number of unknowns is equal to the number of equations 535

Solve the system of 535 and perform an entropy test on the values of the unknowns which are found 545

Do all the unknowns satisfy the entropy test? 555

YES → Correct the errors and verify the integrity of the corrected bit errors using the second plurality of AMAC values computed in 515 565

NO → The hypothesis about the errors is incorrect 566

Exhausted all hypotheses? 575

YES → STOP; Uncorrectable Errors 586

```
┌─────────────────────────────────────────────────────────────────────────────┐
│ Identify a cache line set corresponding to a region of a set of memory      │
│ storage devices, the cacheline set comprising N cache lines each divided    │
│ into K data blocks                                                          │
│                                                                         810 │
└─────────────────────────────────────────────────────────────────────────────┘
                                      │
                                      ▼
┌─────────────────────────────────────────────────────────────────────────────┐
│ Multiply each data block in Galois Field with a constant factor specific to │
│ the data block                                                              │
│                                                                         820 │
└─────────────────────────────────────────────────────────────────────────────┘
                                      │
                                      ▼
┌─────────────────────────────────────────────────────────────────────────────┐
│ Exclusive-or (XOR) the resulting products of the data block multiplication  │
│ to generate a GHASH                                                         │
│                                                                         830 │
└─────────────────────────────────────────────────────────────────────────────┘
                                      │
                                      ▼
┌─────────────────────────────────────────────────────────────────────────────┐
│ Encrypt GHASH to generate AMAC                                              │
│                                                                         840 │
└─────────────────────────────────────────────────────────────────────────────┘
                                      │
                                      ▼
┌─────────────────────────────────────────────────────────────────────────────┐
│ Provide AMAC for storage on a device separate from a memory module          │
│ comprising the memory storage devices                                       │
│                                                                         850 │
└─────────────────────────────────────────────────────────────────────────────┘
```

```
┌─────────────────────────────────────────────────────────────────────────────────┐
│ Receive update to a cacheline in a cache line set corresponding to a region of  │
│ a set of memory storage devices, the cacheline set comprising N cache lines     │
│ each divided into K data blocks                                                 │
│                                                                             905 │
└─────────────────────────────────────────────────────────────────────────────────┘
                                        │
                                        ▼
┌─────────────────────────────────────────────────────────────────────────────────┐
│ Retrieve an AMAC corresponding to the cache line set, the AMAC previously       │
│ generated for the cache line set prior to the update to the cache line          │
│                                                                             910 │
└─────────────────────────────────────────────────────────────────────────────────┘
                                        │
                                        ▼
┌─────────────────────────────────────────────────────────────────────────────────┐
│                    Decrypt AMAC to recover GHASH                                │
│                                                                             915 │
└─────────────────────────────────────────────────────────────────────────────────┘
                                        │
                                        ▼
┌─────────────────────────────────────────────────────────────────────────────────┐
│ Retrieve previous cache line data corresponding to the cacheline prior to the   │
│ update                                                                          │
│                                                                             920 │
└─────────────────────────────────────────────────────────────────────────────────┘
                                        │
                                        ▼
┌─────────────────────────────────────────────────────────────────────────────────┐
│ Multiply original data blocks of previous cache line in Galois Field with       │
│ constant factors specific to the data blocks                                    │
│                                                                             925 │
└─────────────────────────────────────────────────────────────────────────────────┘
                                        │
                                        ▼
┌─────────────────────────────────────────────────────────────────────────────────┐
│ Exclusive-or (XOR) the resulting products of the original data blocks           │
│ multiplication with the recovered GHASH to generate incremental GHASH           │
│                                                                             930 │
└─────────────────────────────────────────────────────────────────────────────────┘
                                        │
                                        ▼
┌─────────────────────────────────────────────────────────────────────────────────┐
│ Multiply updated data blocks of updated cache line in Galois Field with         │
│ constant factors specific to the data blocks                                    │
│                                                                             935 │
└─────────────────────────────────────────────────────────────────────────────────┘
                                        │
                                        ▼
┌─────────────────────────────────────────────────────────────────────────────────┐
│ Exclusive-or (XOR) the resulting products of the updated data blocks            │
│ multiplication with the incremental GHASH to generate updated GHASH             │
│                                                                             940 │
└─────────────────────────────────────────────────────────────────────────────────┘
                                        │
                                        ▼
┌─────────────────────────────────────────────────────────────────────────────────┐
│              Encrypt updated GHASH to generate updated AMAC                     │
│                                                                             945 │
└─────────────────────────────────────────────────────────────────────────────────┘
                                        │
                                        ▼
┌─────────────────────────────────────────────────────────────────────────────────┐
│ Provide updated AMAC for storage on a device separate from a memory module      │
│ comprising the set of memory storage devices                                    │
│                                                                             950 │
└─────────────────────────────────────────────────────────────────────────────────┘
```

*FIG. 9*

AGGREGATE GHASH-BASED MESSAGE AUTHENTICATION CODE (MAC) OVER MULTIPLE CACHELINES WITH INCREMENTAL UPDATES

RELATED APPLICATIONS

This application claims the benefit of priority from and is a continuation of U.S. patent application Ser. No. 16/902,755 filed on Jun. 16, 2020, the full disclosure of which is incorporated herein by reference.

TECHNICAL FIELD

Embodiments described herein generally relate to the field of electronic devices and, more particularly, aggregate GHASH-based message authentication code (MAC) over multiple cachelines with incremental updates.

BACKGROUND

Managing errors in data can include error correction techniques in data storage and communication. Error correction may refer to the practice and study of techniques for identifying and/or correcting errors that occur in data. In computer technology, error correction may be utilized to detect and correct data corruption, such as with error-correcting code (ECC) memory. Data corruption may refer to errors in computer data that occur during writing, reading, storage, transmission, or processing, which introduce undesired changes to the original data. In the absence of error correcting techniques, data corruption can cause data loss and/or system failure. Typically, ECC memory can correct errors which appear in the form of bit perturbations, including single-bit errors. For instance, ECC memory may include additional bits to record parity that can be used to detect single-bit errors. With sufficient parity bits ECC may correct multiple bit errors, or even an entire failing device when there are sufficient parity bits to replace all the lost bits due to a device failure.

BRIEF DESCRIPTION OF THE DRAWINGS

Embodiments described here are illustrated by way of example, and not by way of limitation, in the figures of the accompanying drawings in which like reference numerals refer to similar elements.

FIG. 4 is a flowchart to illustrate a process for storing encrypted data blocks, an encrypted error correction code, and an AMAC, according to some embodiments.

FIGS. 5A-5D are flowcharts to illustrate processes for detection and/or correcting data read from memory, according to some embodiments.

FIG. 8 is a flowchart to illustrate a process for generating an AMAC, according to some embodiments.

FIG. 9 is a flowchart to illustrate a process for updating an AMAC, according to some embodiments.

DETAILED DESCRIPTION

Figure 1:
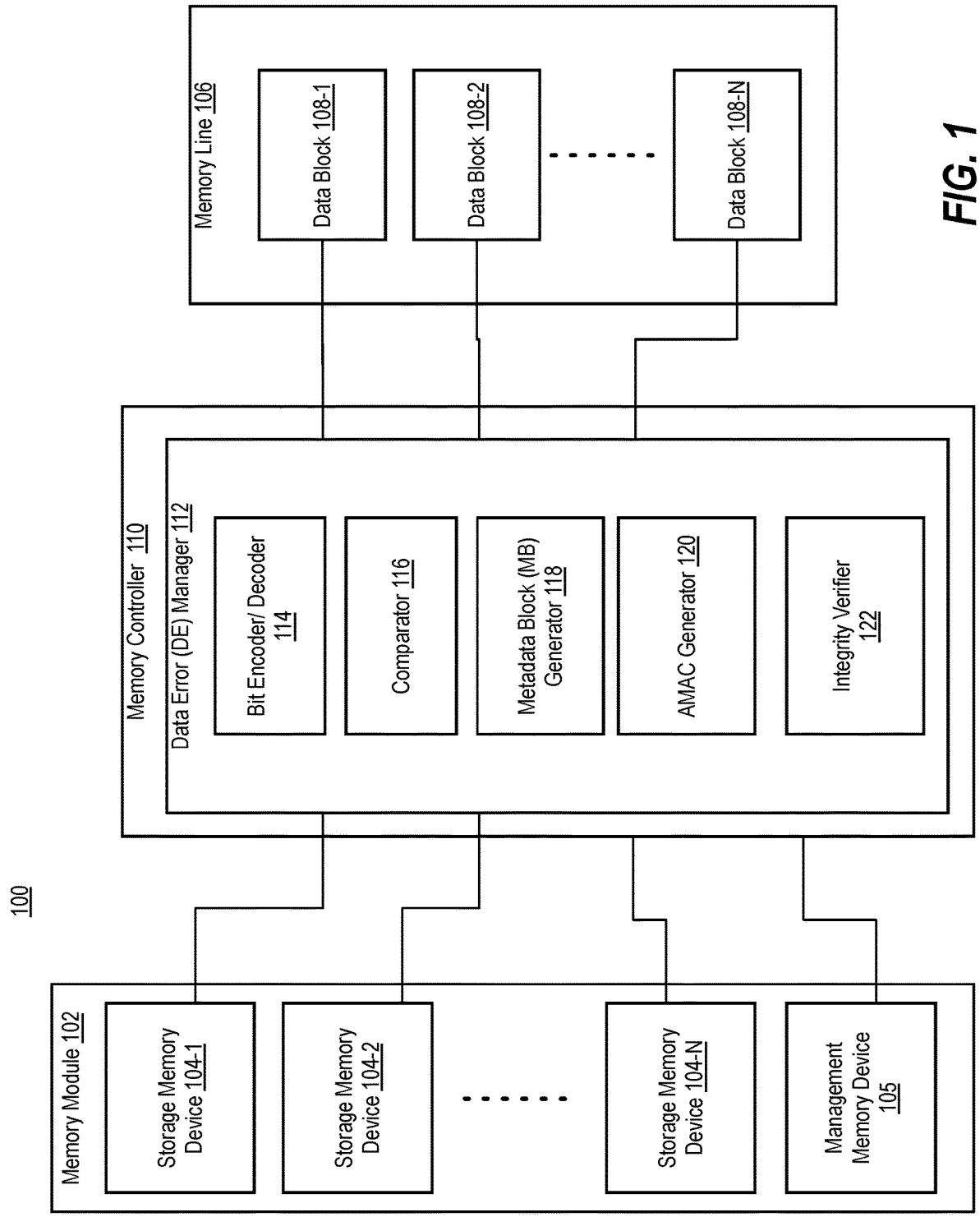
FIG. 1 is an illustration of a system for identifying and correcting data errors and verifying data integrity in accordance with certain embodiments.

Various embodiments are generally directed to techniques for managing errors in data, by using error correcting code (ECC) techniques combined with cryptographically-secure memory encryption and/or integrity, for instance. Some embodiments are particularly directed to providing one or more of error detection, location, and correction combined with cryptographically-secure memory encryption and/or integrity for a set of storage memory devices by utilizing a single management memory device of equivalent type and capacity of the memory devices themselves. In one or more embodiments, the cryptographically-secure memory encryption and/or integrity is provided via an aggregate GHASH-based message authentication code (MAC) over multiple cachelines with incremental updates used for locating errors and reestablishing security by verifying the integrity of memory contents.

In one or more embodiments, the storage and management memory devices may each include a memory chip, and the collective memory chips may be disposed on the same memory module, such as a dual in-line memory module (DIMM). For instance, each memory device be a dynamic random-access memory (DRAM) integrated circuit included in a DIMM. In various embodiments, the set of storage management memory devices may be used to store a memory line, such as an evicted cache line. In many embodiments, cryptographically secure memory encryption and/or integrity may also be provided for the set of storage memory devices and the management memory device.

Some challenges facing the management of data errors include the inability to provide error detection, location, and correction and memory integrity verification without excessive memory overhead and the expense of additional memory. These challenges may result from an ECC memory using two or more management memory devices to enable error location, corrections and integrity verification for a set of storage memory devices. For example, a first management memory device may be used to locate bit errors and a second management memory device may be used to store parity bits to correct bit errors as well as store MACs to verify integrity of stored bits. Where each memory device is a memory chip, such a scheme may include two memory chips in addition to the memory chips that store the target data in order to support error correction. For instance, a memory module according to the fifth generation of double data rate synchronous dynamic random-access memory (DDR5) may utilize eight storage memory devices on a DIMM to store memory lines and two management memory devices for ECC, where a first memory management device may store parity data sufficient to correct a entirely failed memory device and a second memory management device may store error locators (e.g., using a Reed-Solomon code) and additional metadata bits, such as integrity verification data including, for example, MACs.

In some schemes, securing ECC memory cryptographically may utilize additional memory, such as to store indications of MACs. Conventionally, a MAC is stored for each data item (e.g. cacheline) in order to verify its integrity on reads and detect malicious corruptions aiming to undermine the security of the system. MACs on cacheline granularity are associated with high memory overhead, such as 64 b or 128 b MAC associated with 512 b of cacheline data, resulting in up to 25% memory overhead. For example, software guard extensions (SGX) may incur a 25% memory overhead for MAC storage while reducing performance 2×, in extreme cases, due to extra memory reads/writes to manage the MACs due to twice the bandwidth overhead. These and other factors may result in management of data errors with lower performance, excessive overhead, insufficient data security, and increased costs (e.g., due to additional memory chips, wiring, and complexity). Such limitations may reduce the capabilities, usability, and applicability of data error managers, contributing to inefficient systems with limited capabilities, undesirable features, and higher costs.

One conventional approach to securing ECC memory cryptographically is Multiple Key Total Memory Encryption (MKTME) with integrity. MKTME with integrity stores a MAC per cacheline in ECC memory. A SHA-3 based MAC is stored in ECC memory, which repurposes some of the ECC bits from error-correcting codes to a MAC, hence reduces Reliability, Availability, Serviceability (RAS). However, with MKTME with integrity, full-chip correction (SDDC) is not possible, unless storing the overflow ECC bits into sequestered memory or otherwise adding additional memory devices. Storing overflow ECC into sequestered memory is associated with high memory storage and bandwidth overhead, since a MAC is stored per cacheline, causing utilization of additional memory accesses. It is also impractical to use a MAC based on a hashing function over a large data set as updating a single bit in the data would result in reading the entire data set and recalculating the entire MAC for each read/write operation to a subset of that data set. This is the standard property of MACs being irreversible.

Another approach to securing ECC memory cryptographically is Memory Authentication Galois Integrity and Correction (MAGIC). MAGIC provides for storing a GHASH-based MAC in ECC memory that can also provide error correction. MAGIC occupies the same storage as the ECC correction codes as it combines the conventionally distinct MAC and ECC codes into one single value. However, on full-device correction (e.g. due to a device failure), the GHASH of MAGIC is repurposed for correcting the full device, which means it cannot be also used as a MAC. Under this rare scenario, the data is susceptible to undetected corruption, since there is no integrity/parity left to verify the data is correct after chip recovery.

Various embodiments described herein include a data error manager that is able to provide cryptographically secure memory encryption and/or integrity verification, as well as error detection, location, and correction and metadata storage for a memory module (e.g., a DIMM) with a single management memory device. Various embodiments may additionally, or alternatively, be provided for the set of storage memory devices with the single management device. In some embodiments, ECC and metadata may be combined with a cryptographically-strong aggregate GHASH-based message authentication code (MAC) that cannot be circumvented by either random errors or adversarial attacks on physical memory (e.g., via a logic probe, field programmable gate array (FPGA), man-in-the-middle attack on the memory bus, processor to processor interconnect, or other attack). The aggregate GHASH-based MAC of implementations of the disclosure may be referred to as an aggregate MAC (AMAC) that is generated over multiple cachelines with incremental updates. Furthermore, the aggregate GHASH-based MAC of implementations of the disclosure can applied to a set of cachelines pertaining a device and be utilized to address the failure of an entire device on the memory module in terms of both correcting that failed device as well as checking integrity of the corrected values. In some embodiments, multiple AMACs may each be applied to different memory regions, or an AMAC may be applied to the contents of a memory device with multiple AMACs covering each individual memory device for additionally locating a failing device and verifying its contents after data recovery. AMACs may be stored separately from the devices they cover, for example within the processor die or package or in separate memory.

Embodiments of the disclosure provide a supplemental MAC at low cost in order to check the integrity of data after memory device (e.g., chip) recovery. In one embodiment, a MAC construction is provided over multiple cachelines that can be updated efficiently. This construction preserves the MAC properties over a larger data size, while allowing incremental updates per cacheline. This MAC can be updated incrementally without needing to read all the data, which is a property of the GHASH-based solution but cannot be applied to other MAC algorithms such as SHA, without incurring additional bandwidth overheads to fetch the entire dataset over which the MAC is calculated. As such, embodiments of the disclosure provide data integrity in memory with low memory overhead and low bandwidth overhead.

Thus, various embodiments may enable one or more of quick and efficient error corrections, memory protections, improved memory efficiency, improved memory performance, reduced memory hardware, and reduced memory bandwidth utilization, resulting in one or more technical effects and advantages. As an example, ECC memory can be offered at a lower cost without sacrificing security via memory encryption with cryptographic integrity. Furthermore, combining a low cost AMAC with the aforementioned MAGIC-based error correction and integrity, provides a means for preserving data integrity in cases where an entire device has failed and MAGIC provides device recovery, without data integrity. In such cases, AMAC can continue to provide low cost integrity services.

FIG. 1 illustrates a system 100 for identifying and correcting data errors and verifying data integrity in accordance with certain embodiments. System 100 may include a memory module 102 with storage memory devices 104-1, 104-2, . . . 104-N (referred to herein as storage memory devices 104) and management memory device 105, memory controller 110 with data error (DE) manager 112, and memory line 106 with data blocks 108-1, 108-2, . . . 108-N (referred to herein as data blocks 108), where N is any suitable integer. In various embodiments, memory module 102 may include multiple management memory devices 105. In one or more embodiments, DE manager 112 may provide error correction for data stored in memory module 102, such as by generating and storing error correction data in management memory device 105. In one or more such embodiments, error correction data may enable one or more of detection, location, and correction of errors in memory module 102. In many embodiments, DE manager 112 may also, or alternatively, provide cryptographically secure memory encryption and integrity for data stored in memory module 102. In various embodiments described herein, DE manager 112 may provide, via a single management memory device (e.g., management memory device 105), one or more of error detection, location, correction, encryption, and integrity for data stored in multiple storage memory devices 104 of memory module 102. In some embodiments, DE manager 112 may be able to detect, locate, and correct multiple errors occurring in a data block or metadata block in a storage memory device 104 or a management memory device 105.

Memory line 106 may represent data to be stored in memory module 102. In various examples, memory line 106 may include a cache line that has been evicted from a processor cache (e.g., of a host device) that is to be stored in memory module 102 or a cache line that is to be loaded/retrieved from a memory (e.g., memory module 102) and placed into the processor cache. In some embodiments, data blocks 108-1, 108-2, . . . 108-N may each represent a distinct portion of the memory line 106, such as a memory row. In various embodiments, data representing each of data blocks 108 may be stored in corresponding storage memory devices 104-1, 104-2, . . . 104-N. For example, data representing data block 108-1 may be stored in storage memory device 104-1, data representing data block 108-2 may be stored in storage memory device 104-2, and so on. In one example, DE manager 112 may perform a bit encoding operation on data block 108-1 and store the result in storage memory device 104-1, then (or simultaneously) perform a bit encoding operation on data block 108-2 and store the result in storage memory device 104-2, and so on for each data block of memory line 106. Thus, in some embodiments, the number of data blocks 108 of a memory line 106 may equal the number of storage memory devices 104 in memory module 102.

In some embodiments, DE manager 112 may store metadata associated with memory lines in management memory device 105 to enable one or more of error detection, location, correction, encryption, and integrity for data stored in memory module 102. In many such embodiments, at least a portion of the data stored in management memory device 105 is generated based on data of memory line 106. In some embodiments, metadata blocks associated with memory lines are stored based on the storage location of data blocks representing the memory lines. For example, if data blocks representing a particular memory line are stored in respective first physical rows of storage memory devices 104, a corresponding metadata block is stored in the first physical row of management memory device 105; if data blocks representing another memory line are stored in respective second physical rows of storage memory devices 104, a corresponding metadata block is stored in the second physical row of management memory device 105, and so on. Other embodiments may include different storage schemas.

In various embodiments, memory module 102 may comprise computer memory that includes a plurality of memory chips that can be represented by storage memory devices 104 and management memory device 105. For example, management memory device 105 may be a first memory chip, storage memory device 104-1 may be a second memory chip, storage memory device 104-2 may be a third memory chip, and so on. In one example, memory module 102 may include a DIMM with a set of memory chips. In some embodiments, multiple memory modules 102 (e.g., DIMMs) may be included in a computer system. In some such embodiments, the collection of memory modules 102 in a computer may be referred to as or included within the external memory of the computer (e.g., random access memory (RAM)).

In various embodiments, storage memory devices 104 and management memory device 105 of memory module 102 may include one or more of ECC memory, DDR memory, hard drive storage, redundant array of independent disks (RAID) storage, flash memory, nonvolatile memory, 3D crosspoint memory, and the like. In some embodiments, each storage memory device 104 and management memory device 105 in memory module 102 may be the same or similar. For example, each device may comprise the same amount(s) of the same type(s) of memory. As another example, each device may comprise the same form factor (e.g., physical dimensions, electrical connector pinout, etc. In such embodiments, distinctions between storage memory devices 104 and management memory device 105 may reside in the purpose they are used for. Therefore, in some such embodiments, whether a memory device is used as a management memory device 105 or a storage memory device 104 may be arbitrary and/or selectable.

From a redundancy perspective, the distinctions between the memory devices may be physical boundaries that represent the probable extent of a physical failure. For instance, one physical chip or its associated wiring may fail, while the other physical chips or their associated wiring may remain operational. In other embodiments, the physical boundaries may be defined within the physical device, such as a physical row, column, bank, or other adjacency of memory circuits. For example, in a RAID system, each storage memory device 104 may be a distinct hard drive and management memory device 105 may be a separate hard drive used to correct one or more failing hard drives.

Memory controller 110 may include DE manager 112 as well as other circuitry (e.g., circuitry for communicating with memory module 102). DE manager 112 may include bit encoder/decoder 114, comparator 116, metadata block (MB) generator 118, AMAC generator 120, integrity verifier 122, and any other suitable circuitry. In some embodiments, DE manager 112 may implement combined ECC and integrity verification, such as via one or more of bit encoder/decoder 114, comparator 116, MB generator 118, AMAC generator 120, and integrity verifier 112. In one or more embodiments, DE manager 112 may utilize bit encoder/decoder 114, comparator 116, MB generator 118, AMAC generator 120, and/or integrity verifier 122 to provide combined error correction and integrity verification for data stored in memory module 102. DE manager 112 may utilize management memory device 105 to store data used to enable the error detection, error correction, confidentiality, and/or integrity. For example, data generated by one or more of bit encoder/decoder 114, comparator 116, MB generator 118, AMAC generator 120, and/or integrity verifier 122 may be stored in management memory device 105. For example, data such as correction blocks and generated AMACs, may be generated and stored in management memory device 105 or separate on-chip memory to facilitate detection of and/or correction of data errors, as well as to facilitate integrity verification of such corrected data errors, present in data stored in one or more storage memory devices 104.

In various embodiments, the DE manager 112 is able to provide error detection, location, correction, confidentiality, and/or integrity for the storage memory devices 104, at least in part by performing various logical operations on data blocks 108 utilizing components of DE manager 112, such as bit encoder/decoder 114, comparator 116, MB generator 118, AMAC generator 120, and/or integrity verifier 122. In various embodiments, DE manager 112 may implement one or more of these features for data to be stored by a group of storage memory devices 104 via a single management memory device (e.g., management memory device 105). In various embodiments, using a single management memory device 105 to implement one or more of the features described herein may reduce the resources used to implement the one or more features described herein.

In some embodiments, DE manager 112 may combine ECC with a cryptographically strong MAC that prevents circumvention by either random errors or adversarial attack on physical memory (e.g., memory chips). In one or more embodiments, DE manager 112 may store the combined ECC and MAC in management memory device 105. In some embodiments, MACs may be used for one or more of memory integrity, providing a variety of usages including data corruption detection, memory access control, virtual machine isolation, or other purposes.

In some embodiments, the DE manager 112 may further generate an AMAC over multiple lines or rows of the storage memory devices 104-1 through 104-N of the memory module 102. The AMAC may further support facilitate integrity verification of corrected data errors in the storage memory devices 104-1 through 104-N of the memory module 102. In one embodiment, the AMAC generated by DE manager 112 may be generated separately from and used in addition to any combined ECC and MAC stored in management memory device 105. The AMAC can be used to verify integrity of corrected data upon occurrence of a full device failure in the memory module 102. For example, the AMAC can be utilized when one or more of storage memory devices 104-1 through 104-N fail in their entirety. In the case of such a full device failure, the combined ECC and MAC discussed above is used to completely replace the contents of the failed device. However, in this case, the integrity of the combined ECC and MAC is lost. As such, embodiments described herein provide the AMAC by recombining the multiple rows of storage data that is used to verify integrity of the corrected data in such a case of full device failure in the memory module 102, verifying the failed device data was recovered correctly. In some embodiments, the AMAC can be further used to detect which device has failed as a replacement mechanism to Built-In Self Tests (BIST), which typically detect such device failures. In some embodiments, a plurality of AMAC values computed in the same regions of memory can be used to correct a plurality of errors which may be present in more than one data block as well as verify the integrity of the corrected bit errors.

In one embodiment, the AMAC may be a GHASH-based MAC. A GHASH refers to an authentication component that employs a plurality of powers of at least one secret, where the powers of at least one secret are multiplied with data blocks and where the products of such multiplications are added to each other in order to produce a MAC. One instance of the GHASH-based MAC is part of the Galois/Counter Mode (GCM). GCM is a mode of operation for symmetric-key cryptographic block ciphers widely adopted for its performance. The Galois/Counter Mode (GCM) of operation provide single-pass authenticated encryption. The GHASH authentication component of GCM belongs to a class of Wegman-Carter polynomial hashes that operate in the field $GF(2^{128})$. The generation and utilization of the supplemental AMAC are described in more detail below in connection with FIGS. 2-9. Other embodiments may use XOR operations to generate and combine multiple MACs for individual lines into a single AMAC.

In one or more embodiments, bit encoder/decoder 114 may be used to randomize/derandomize bits in a data block 108 prior to the bits being stored in memory module 102, prior to being applied to the computation of an AMAC value or both. For example, data block 108-1 may be randomized to generate an encoded block that is stored in storage memory device 104-1. In some embodiments, data transformation by bit encoder/decoder 114 may result in bit diffusion (permutation and distribution) such that a one-bit change in the input will on average flip 50% of the bits in the output. In various embodiments, bit encoder/decoder 114 may provide two-way operation such that any data transformations performed by bit encoder/decoder 114 may be reversible, such as through cryptography. For instance, data blocks 108 may be recovered from encoded data blocks stored in memory module 102. Some embodiments may include separate bit encoder and bit decoder components. In various embodiments, encoding and decoding may be inverse operations. In some embodiments, encoding and decoding may be symmetric operations. In yet other embodiments randomization may be applied to the AMAC value, where in this case randomization is referred to as "blinding". Exemplary memory read and write flows will be described in more detail below in connection with FIG. 2 and FIG. 3.

In some embodiments, bit encoder/decoder 114 may utilize a cryptographic algorithm, such as a block cipher. In various embodiments, one or more keys may be used by bit encoder/decoder 114 to encrypt/decrypt data, such as in conjunction with a block cipher. For example, bit encoder/decoder 114 may utilize a key to encrypt a data block 108 or a metadata block prior to storage in a storage memory device 104 or management memory device 105 respectively and to decrypt data retrieved from a storage memory device 104 or management memory device 105 to recover a data block 108 of memory line 106 or metadata block. Some embodiments may include separate encryption and decryption components within bit encoder/decoder 114. In various embodiments, the encryption and decryption operations performed by bit encoder/decoder 114 may be inverse operations. In some embodiments, the encryption and decryption operations may be symmetric operations.

In a particular embodiment, the block cipher input and output blocks are the same size. In many embodiments, the block cipher input block may match the bit size of a data block 108 of memory line 106 and/or the bit size of a metadata block associated with memory line 106. In one or more embodiments, the block cipher output may match a bit size of a storage memory device or management memory device. In an example, the block cipher output matches a memory device size for a row of a stored memory line. In various embodiments disclosed herein, plaintext may be used to refer to one or more of decoded, nonencrypted, de-diffused, and/or decrypted data blocks or correction blocks while ciphertext may be used to refer to one or more of encoded, diffused, and/or encrypted data blocks or correction blocks.

In many embodiments, comparator 116 may be used to verify whether data has become corrupted, e.g., during a memory read. For instance, comparator 116 may compare values, such as error correction codes generated by MB generator 118 to corresponding data blocks to ensure data has not changed. In various embodiments, comparator 116 may perform one or more entropy tests on read data to identify errors in read data. Comparator may also provide information associated with error identification.

In many embodiments, MB generator 118 may be used to generate values (e.g., error correction codes) that enable error detection and correction for memory module 102. In some embodiments, the error correction codes include or are based on parity bits. In various embodiments, MB generator 118 may provide two-way operation such that any data transformations performed by MB generator 118 may be reversible. In one or more embodiments, MB generator 118 may generate an error correction code by performing logical operations on portions of memory line 106. For instance, an error correction code may be generated by bitwise XORing plaintext from each of data blocks 108 together. Other embodiments may first multiply data blocks with powers of secrets and then perform a bitwise XOR logical operation on the product. XOR operators or operations may be advantageously used to generate error correction codes because XOR operations are order independent (commutative and associative) and there is no overflow/carry (i.e., input and output are the same size). Also, an XOR operation may be the same as an addition operation on integers modulo 2. However, additional or alternative data transformation may be used by MB generator 118 to generate an error correction code. For example, in some embodiments the MB generator 118 may perform addition, subtraction, multiplication, division, or other operations (e.g., to data blocks 108), but such operations may cause overflow/underflow and/or carry values. Thus, such operations may only be suitable for some data (e.g., small numbers) unless the overflow/underflow and carry values are accounted for. In another example, additional transformations may be performed along with an XOR operation, such as additional bit permutations or even full diffusion with encryption. In a further example, lossless compression may be used to generate error correction codes. In other examples, Hamming codes, code book substitutions, or similar techniques may be used to generate error correction codes.

In various embodiments, DE manager 112 may store a respective metadata block containing an error correction code in management memory device 105 for each memory line 106 stored in the set of storage memory devices 104. In one or more embodiments, bit encoder/decoder 114 may encode and/or encrypt the metadata blocks prior to storing them in management memory device 105. In various embodiments described herein, the error correction codes of the metadata blocks may be used to correct bit errors in a memory line read from memory module 102. Example error correction flows is described in more detail below in connection with FIGS. 2-5.

In various embodiment, AMAC generator 120 is used to generate an AMAC over a region of the storage memory devices 104-1 through 104-N of the memory module 102. In one embodiment, the region may refer to a memory line/row set of the storage memory devices 104-1 through 104-N. For example, the region (e.g., the cacheline set) for the AMAC may include all of the storage memory devices 104-1 through 104-N, a subset of the storage memory devices 104-1 through 104-N, an individual storage memory device of the storage memory devices 104-1 through 104-N, or a portion of an individual storage memory device of the storage memory devices 104-1 through 104-N. In embodiments of the disclosure, the region vary from "per device" of the memory module 102 through the entire memory module 102. In one embodiment, the region may match the size of a bank of the memory module 102 to align the AMAC to banks of the memory module. In one embodiment, the regions used for generating an AMAC may include individual storage memory devices 104-1 through 104-N, where a first region corresponds to storage memory device 104-1, a second region corresponds to storage memory device 104-2, and so on. Each region may have its own associated AMAC generated by AMAC generator 120. In one embodiment more than one AMAC value may be computed and stored for the same region of memory. Example AMAC generation is described in more detail below in connection with FIGS. 2-9.

In various embodiment, integrity verifier 122 may be used to verify whether corrected data has maintained integrity. In some embodiments, the integrity verifier 122 utilizes the generated AMAC to verify integrity of data that has been corrected upon a full device failure in the memory module 102. As previously discussed, in the case of such a full device failure, the combined ECC and MAC can be used to completely replace the contents of the failed device. However, the integrity of the combined ECC and MAC is lost when used for such error correction of the complete contents of a storage memory device 104. As such, the integrity verifier 122 described in embodiments herein can utilize an AMAC generated by AMAC generator 120 over a region of the memory module 102 to verify integrity of the corrected data in the case of a full device failure in the memory module 102. Here a single AMAC value represents the total integrity of a number of memory rows or lines and, therefore, may be used to re-total the associated set of memory lines and to verify the lost device data was correctly recovered. For example, if the combined MAC and ECC parity is a MAGIC parity, then all of the bits of the MAGIC parity are used for the recovery of a failed device, due to the way the MAGIC parity is computed. Because of this reason the MAGIC parity is insufficient to guarantee the integrity of the recovered device. In another example, the metadata block consists of a Reed Solomon Code followed by a truncated MAC value computed using the Secure Hash Algorithm-3 (SHA-3). If the device which holds the metadata block 240 fails, then any recovery mechanism that restores such metadata block is incapable of guaranteeing the integrity of the recovered metadata block 240. This problem is solved by implementations of the disclosure, where integrity support is provided by the AMAC value. Example integrity verification using an AMAC is described in more detail below in connection with FIGS. 2-9.

Figure 2:
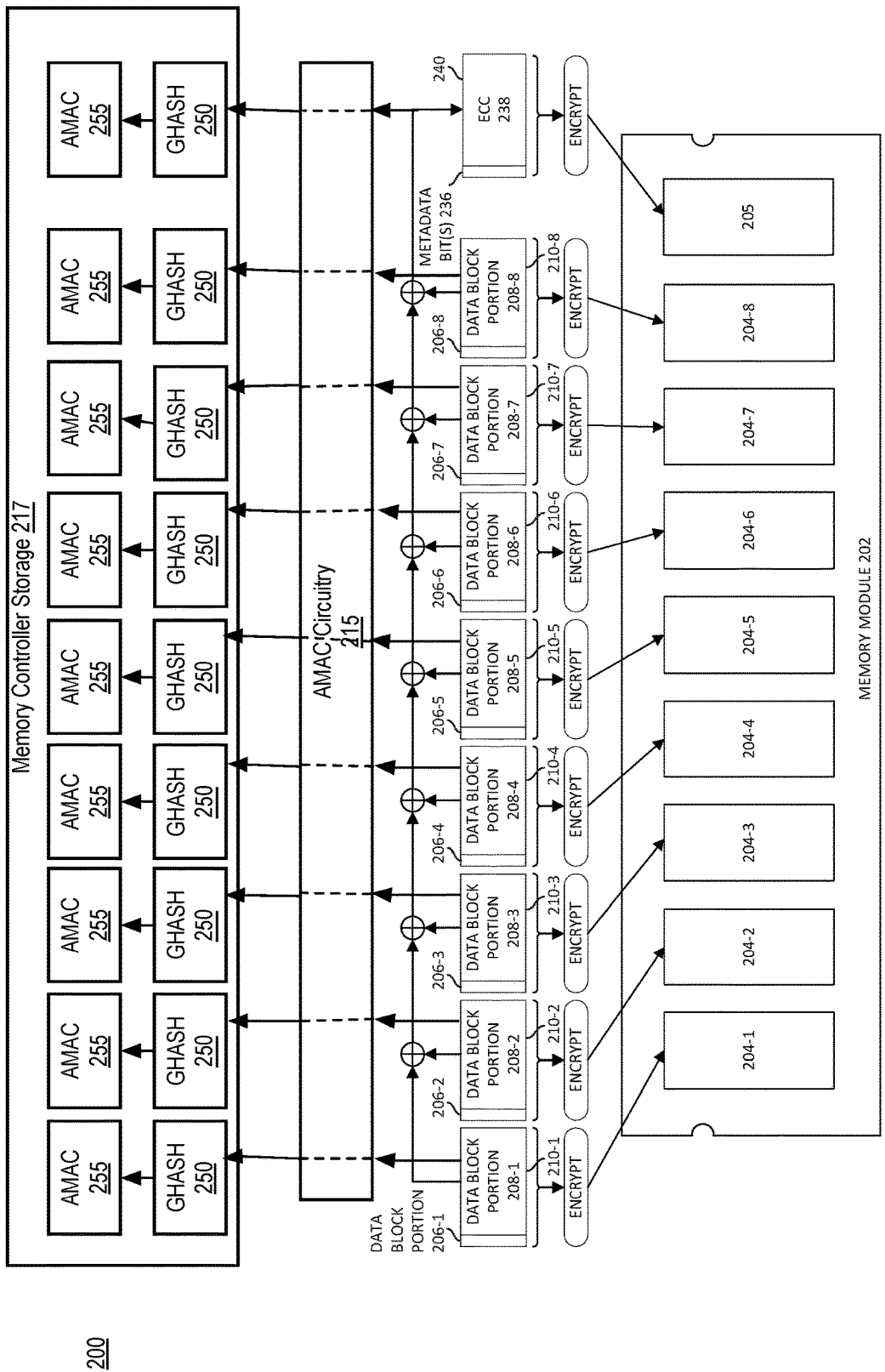
FIG. 2 illustrates a flow for generating a metadata block and an aggregate message authentication code (AMAC), and storing an encrypted metadata block, the AMAC, and encrypted data blocks in accordance with certain embodiments.

FIG. 2 illustrates a flow for generating a metadata block and AMAC, and storing an encrypted metadata block, AMAC, and encrypted data blocks in accordance with certain embodiments. The generation of the metadata block and AMAC, and storage of the encrypted metadata block, AMAC, and encrypted data blocks may occur during a write flow of a memory line (e.g., 106) to a memory module 202. In various embodiments, one or more components illustrated in FIG. 2 may be the same or similar to one or more components in FIG. 1. For instance, memory module 202 may have any one or more characteristics of memory module 102, management memory device 205 may have any one or more characteristics of management memory device 105, the data blocks 210 (i.e., 210-1, 210-2, etc.) may have any one or more characteristics of data blocks 108, and the metadata block 240 may have any one or more characteristics of a metadata block described in connection with FIG. 1.

In various embodiments, the flow of FIG. 2 may be performed by memory controller 110 (e.g. utilizing DE manager 112), memory controller 110 in conjunction with circuitry coupled to memory controller 110, and/or other suitable circuitry. In one or more embodiments described herein, metadata block 240 and AMAC 255 may be generated based on each of data blocks 210 (e.g., of a memory line). In one or more such embodiments, metadata block 240 and/or AMAC 255 may facilitate one or more of error detection, location, correction, encryption, and integrity for data stored in memory module 202. Embodiments are not limited in this context. In one embodiment, metadata block 240 may be a combined MAC and ECC code value. This can provide for both secure integrity as well as correction. However, if the correction is for an entire failed device, the integrity aspect is lost from this single combined value as all the information (bits) is used for correction.

In many embodiments, the data blocks 210 collectively constitute a memory line, such as an evicted cache line that is to be stored in a memory row external to a host, such as memory module 202. For instance, the memory line may be evicted from a processor cache of the host. In one example, the memory line may include 64 bytes while each of data blocks 210 include 64 bits. In other embodiments, the memory line and each of data blocks 210 may be any other suitable size (e.g., 128 bytes and 128 bits respectively). In various embodiments, each of data blocks 210 may represent a row of the memory line. In some embodiments, data blocks 210 may collectively include the plaintext of the memory line. In one or more embodiments, each of data blocks 210 may be the same size. In a particular embodiment, metadata block 240 is the same size as each of data blocks 210 to facilitate correction of a failed device of equivalent capacity.

In some embodiments, during a write operation to memory module 202, at least a portion of the bits of each of data blocks 210 of a row may be XORed together to generate XORed plaintext of the error correction code 238 of the metadata block 240. This XORed value may then be encrypted using a secret key and stored in management device 205. In various embodiments, a reduced-length parity value is calculated over only a portion of the bits (e.g., data block portions 208) of data blocks 210 to generate error correction code 238, while a remaining portion of the bits (e.g., data block portions 206) are not involved in the parity calculation. As an example, if each of the data blocks 210 is X bits wide, the metadata block 240 is X bits wide, and S metadata bit(s) 236 are stored in the metadata block 240; then the parity may be calculated (e.g., by performing an XOR operation) over X-S bits of each data block 210 (e.g., the most significant X-S bits, the least significant X-S bits, or any other suitable X-S bits of each data block) to generate an X-S bit error correction code 238 (the bits of the data blocks used to generate the error correction code 238 may be in the same position within each data block 210). In one example the S bits of metadata are bits of a Reed Solomon ECC code and the X-S parity bits are MAGIC parity bits. In another example the S bits of metadata are bits of a truncated SHA-3 MAC and the X-S parity bits are MAGIC parity bits. In yet another example, example, if metadata bit(s) 236 includes 32 metadata bits and the data blocks 210 and metadata block 240 are each 64 bits wide, a 32-bit parity value for the error correction code 238 may be calculated by XORing 32 bits of each of the data blocks 210; if metadata bit(s) 236 includes 8 metadata bits, the parity value for the error correction code 238 may be calculated by XORing 56 bits of each of the data blocks 210; and so on. In particular embodiments, S may be any reasonably low integer (e.g., 1-4 bits), although S may alternatively be a higher integer in other embodiments. In some embodiments, the number of metadata bits (S) per metadata block 240 may be user configurable to allow flexibility based on the application.

Although the figure depicts a partial length parity calculation (e.g., that may be performed for all or some of the memory lines stored in memory module 202), in other embodiments full length parity calculations may be used and the metadata bits 236 for various memory lines stored in memory module 202 may instead be stored on an additional management memory device 105 (or the metadata bits 236 may be interspersed with the error correction code 238 across two or more management memory devices 105). Such embodiments may still benefit from various techniques (e.g., error detection and correction techniques) described herein despite not benefiting from the reduced footprint that a single management memory device 105 provides.

Any suitable data may be stored in the metadata bit(s) 236 of metadata blocks 240, or none at all. The metadata bit(s) 236 may be data distinguished from the error correction code 238 (e.g., metadata bit(s) 236 are not parity bits, or at least are not parity bits from the same calculation used to generate error correction code 238). In some embodiments, metadata bit (s) 236 of a metadata block 240 comprise metadata for the memory line corresponding to the metadata block 240.

Metadata bit(s) 236 may include any suitable metadata. As one example, metadata bit(s) 236 may comprise one or more locator bits for identifying a bad memory device (e.g., a memory device in which one or more errors have occurred) from among the memory devices 204 and 205 (e.g. using a Reed-Solomon code), a poison bit for the memory line corresponding to the particular metadata block 240 (e.g., the poison bit may be set if an error is detected in the memory line and the error is uncorrectable by the memory controller 110), one or more directory bits (for use in cache coherency schemes to identify a location, e.g., a different semiconductor package, in which the memory line is cached), one or more encryption bits specifying whether and/or how the memory line is encrypted, one or more key identifier bits specifying a key used for encrypting the memory line, one or more wear leveling bits associated with an address of the memory line, or other suitable metadata. Some systems may utilize cryptographic MACs for memory integrity (e.g. KMAC, GMAC, or HMAC), which enable a variety of usages including data corruption detection, memory access control, virtual machine (VM) isolation, and others. Such systems utilizing MACs may utilize separate metadata stored for each memory line in the metadata bit(s) 236 of the correction block corresponding to the memory line. As such, the metadata bit(s) 236 can provide combined ECC and integrity for the memory devices 204. As previously discussed, some systems utilize a combined MAC and ECC values, which are stored on memory device 205. If memory device 205 is the device that fails, then the integrity MAC is lost. As such, implementations of the disclosure provide a secondary integrity verification value, an AMAC, that can be used to recover integrity in the case of such a device failure.

However, as described above, when the metadata bits 236 are used for the case of a full device failure of the memory devices 204 or 205, the ability to provide integrity verification via the metadata bits 236 is lost and, as such, the metadata bit(s) 236 cannot be utilized for data integrity verification purposes. For example, there can be two potential failure scenarios where metadata bits 236 cannot be utilized for data integrity verification purposes. In a first failure scenario, there is a combined (single value) ECC and MAC value stored in memory device 205. In this first failure scenario, if there is a full device failure of any of memory device 204, then all of the combined ECC and MAC bits are utilized to correct the failed device and integrity is lost. In a second failure scenario, there can be two distinct values stored in memory device 205, one ECC and one MAC. In this second failure scenario, the MAC is lost if the memory device 205 fails (e.g., loss of one of the memory devices 204 does not affect the MAC stored in memory device 205). In both failure scenarios, the AMAC of embodiments of the disclosure can be used to recover integrity.

As such, embodiments of the disclosure provide AMAC circuitry 215 to generate a GHASH-based MAC 250, which may be blinded (i.e., encrypted) as an AMAC 255 for use in integrity verification of corrected data of the memory devices 204. In one embodiment, the AMAC 255 may be used for integrity verification purposes upon correction of a full device failure of the memory devices 204 or 205.

In one embodiment, the AMAC circuitry 215 may generate an AMAC over one or more regions of the memory devices 204, 205. The region(s) may include all of the memory devices 204, 205 or a subset of the memory devices 204, 205, with an AMAC generated for each region. For each region, the AMAC circuitry 215 may generate a GHASH-based MAC over multiple memory rows or lines of the memory device(s) 204 and/or 205 of the region. The AMAC circuitry 215 may include GF multipliers and XOR trees. Each memory row/line in a region may include one or more data blocks 208. Using the GF multipliers of the AMAC circuitry 215, each data block is multiplied in Galois Field with a parameter H i,j. The resulting products are XORed together (e.g., via the XOR trees) in order to generate a GHASH 250. The parameter H i,j may be a secret constant factor which may be a secret hash key that is generated from one or more multiple random seeds, similar to an encryption key. In one embodiment, parameter H can be generated by raising the seed value to the power of (i*K+j), where i represents the cacheline in the cacheline set of the region, j is the data block in the cacheline set of the region, and K is the total number of data blocks a cacheline in the cacheline set is divided into. The GHASH 250 generated by the AMAC circuitry 215 may be blinded (e.g., encrypted) in order to generate the AMAC 255. The blinding may be performed by using a block cipher (e.g., AES, Simon, PRINCE, Spec, ThreeFish etc.) and a secret blinding key, B, for example.

The data of metadata bit(s) 236 and the AMAC 255 may be consumed by the memory module 202 or by one or more components of a host computing system that utilizes the memory module 202 to store data (e.g., the memory controller 110 or a processor core). In one embodiment, the AMAC 255 is stored in memory controller storage 217, which may include a register of a memory controller. Storage of the AMAC 255 separately from the metadata bits 236 and ECC 238 protects against the failure scenario of failure of the memory device 205. Furthermore, as the AMAC is an aggregated MAC over a a range of memory or a whole device, it does not have significant storage requirements, hence one or a small set of AMACs can cover a range of memory, unlike traditional MACs, that may have an overhead of up to 25% of memory. In another embodiment, the AMAC may be stored in a CPU core, in a dedicated register file, set associative memory or other efficient circuitry which is part of the CPU core.

In the illustrated embodiment, bit encoding operations may include encryption operations. In one or more embodiments, data blocks 210 may be encrypted (e.g., via bit encoder/decoder 114 with a block cipher having a block size the same as the size of each of data blocks 210) and the encrypted data blocks may be stored in respective storage memory devices 204. For example, encrypted data block 210-1 (including portions 206-1 and 208-1) may be stored in storage memory device 204-1, encrypted data block 210-2 (including portions 206-2 and 208-2) may be stored in storage memory device 204-2, encrypted data block 210-3 (including portions 206-3 and 208-3) may be stored in storage memory device 204-3, and so on through encrypted data block 210-8 (including portions 206-8 and 208-8) being stored in storage memory device 204-8. In various embodiments, metadata block 240 (including the metadata bit(s) 236 and the error correction code 238) may be encrypted (e.g., via bit encoder/decoder 114 with a block cipher) and stored in management memory device 105. In various embodiments, the AMAC may be encrypted as well. In other embodiments, metadata block 240 and/or data blocks 210 may be diffused instead of encrypted. The term "diffusion" may refer to bit mixing operations that are cryptographically weaker than encryption. For example, diffusion is a process that uses a reduced number of AES rounds such as a 2 round AES process. In some embodiments, one or more of error detection, location and/or correction may be provided for data stored in memory module 202, however, security and/or integrity may not be guaranteed for data stored in memory module 202 (e.g., the data blocks 210 and/or metadata block 240 may be written to memory devices 204 and/or 205 in an unencrypted state). In various embodiments, data may be written or stored to memory module 102 through memory controller 110.

As previously mentioned, in many embodiments, the block cipher input block may match the bit size of a data block of the memory line. For instance, Simon, Speck64, Prince, Data Encryption Standard (DES), or Triple DES (3DES) may represent ciphers that match the 64-bit data block size for DDR5 memory. In another instance, Simon32 or Speck32 may represent ciphers that match the 32-bit block size for DDR4 memory devices. In yet another instance, advanced encryption standard (AES) may be used, such as in conjunction with storage memory devices with a device density of 128 bits per transaction (contribution per memory line). In other embodiments, other ciphers for any suitable block size may be used. In some embodiments, reduced round block ciphers may be used (e.g., 2 rounds of AES instead of the recommended 10 rounds, etc.). In one or more embodiments, the block cipher output may match a bit size (e.g., number of bits) of a memory device (e.g., a storage memory device 204 and/or management memory device 205). For instance, the block cipher output size may match the size of a row of a memory device 204 or 205. Thus, the block cipher output size may correspond to the bits of a memory line stored by a single memory device (e.g., 204).

In various embodiments, encryption may be performed using a secret key. In some embodiments, encryption may be performed in accordance with multi-key total memory encryption (MKTME). In some such embodiments, the key to use in encryption operations may be determined, (e.g., by memory controller 110, DE manager 112, or other circuitry) based on address bits (e.g., one or more address bits of physical address of the particular memory line being encrypted) or other metadata that indicates which key to use. In some instances, usage of an incorrect key to decrypt data may result in an integrity violation and/or uncorrectable error. In various embodiments, the use of a wrong key may be detected in addition to or in place of detecting bit errors. Furthermore, in one or more embodiments, xor-encrypt-xor based tweaked-codebook mode with ciphertext stealing (XTS) mode, or other tweakable modes such as Liskov, Rivest, and Wagner (LRW), may be used to encrypt a data block 210. In one or more embodiments, XTS mode may be used and the physical memory address of each data block 210 is used as an additional tweak so that all ciphertext data blocks will look different for different addresses.

Figure 3:
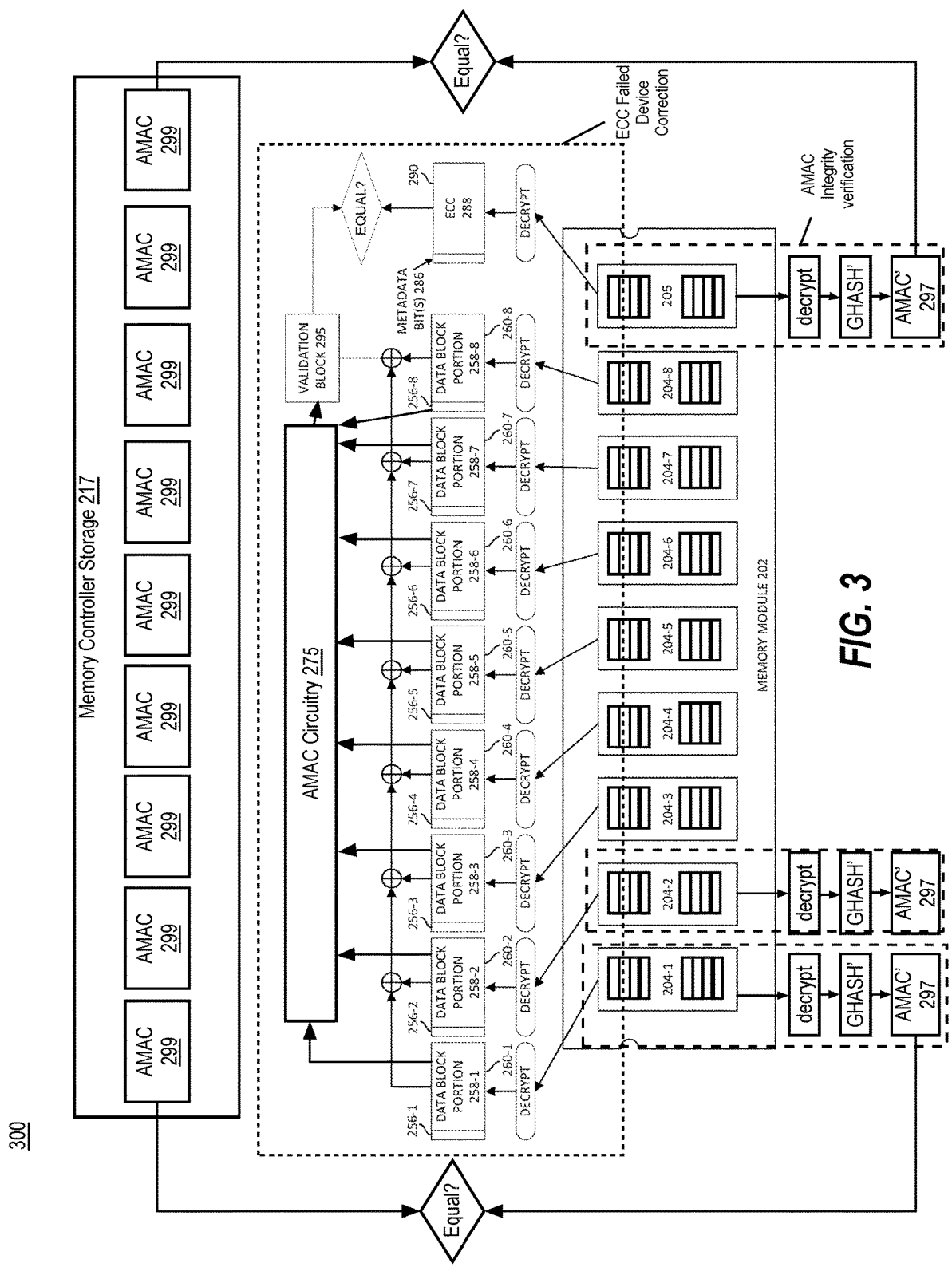
FIG. 3 illustrates a flow for identifying a data error and verifying integrity in accordance with certain embodiments.

FIG. 3 illustrates a flow for identifying a data error and verifying integrity in accordance with certain embodiments. The flow of FIG. 3 may be representative of a read flow or a device recovery flow from memory module 202. In various embodiments, one or more components illustrated in FIG. 3 may be the same or similar to one or more components in FIG. 1 or FIG. 2. For instance, data blocks 260 (i.e., 260-1, 260-2, etc.) may have any one or more characteristics of data blocks 108 or data blocks 210, and the metadata block 290 may have any one or more characteristics of the metadata block 240 of FIG. 2. In various embodiments, the flow of FIG. 3 may be performed by memory controller 110 (e.g. utilizing DE manager 112), memory controller 110 in conjunction with circuitry coupled to memory controller 110, and/or other suitable circuitry.

In one or more embodiments, data associated with a memory line (e.g., the data stored in memory module 202 as part of the flow of FIG. 2) may be read from memory module 202 and decrypted. For example, data may be read from management memory device 205 and decrypted to generate metadata block 290 and data may be read from storage memory devices 204-1 through 204-8 and decrypted to generate data blocks 260-1 through 260-8 (which may be in plaintext format). In an embodiment, at least a portion of each decrypted data block 260 may be used to generate a validation block 295 that is compared to at least a portion (e.g., error correction code 286) of the metadata block 290 and/or to the GHASH 297 (e.g., of decrypted AMAC 299) to verify integrity and/or correctness of the data. In another embodiment the metadata 290 block may be produced from ciphertext blocks. In this embodiment the generation of the metadata block 290 and the further decryption of data blocks 258-1 up to 258-2 are operations that are independent of each other and may proceed in parallel. It should be understood that, depending on the processing step, where encryption and decryption is applied, and depending on whether encryption and decryption is applied on data blocks, AMAC values, or both, some of the encryption and decryption operations discussed herein may be actual encryption and decryption operation and some may be equal to the identity function. Furthermore, embodiments are not limited in this context. In one embodiment, AMAC is used in response to a full device failure (e.g. memory device 205 fails) and there is loss of integrity. In this case, all the memory lines for memory module 202 would be compiled and an AMAC generated (e.g., provided as validation block 295 in FIG. 3) based on all the memory device 204. If the stored AMAC 299 matches the generated AMAC (e.g., validation block 295), then integrity can be restored.

In some embodiments, the portions 258 (e.g., 258-1 through 258-8) of each of decrypted data blocks 260 are XORed together to generate XORed plaintext to form validation block 295. In other embodiments, data blocks are first multiplied with secret values and then XOR-ed together. The portions of the decrypted data blocks 260 that are XORed may be the same portions that were XORed to form the error correction code 288 when the data blocks were written to memory module 202. In some embodiments, the error correction code 288 of metadata block 290 and the validation block 295 may be compared to determine if they are equal. For instance, the error correction code 288 of metadata block 290 and the validation block 295 may be compared by comparator 116. If the error correction code 288 of metadata block 290 and the validation block 295 are equal, it may be determined that no bit error or data corruption has occurred for the memory line. However, if the error correction code 288 of metadata block 290 and the validation block 295 are not equal, it may be determined that one or more bit errors or data corruption have occurred. In various embodiments, when a bit error or data corruption is detected, an error correction flow may be entered.

In one embodiment, an error correction flow may determine which of the devices has bit errors by considering a single device of memory devices 204, 205 as under test and XORing one of the remaining devices data 256, and the remaining devices data 256 times a secret value from the ECC value 288 and encrypting the result. That result is then compared to the ciphertext of the memory device 204 under test. If there are only a few bits different between the device block's ciphertext and the calculated ciphertext, that is likely the device in error. If half the bits are different, then it is not likely the device in error and the next device can be tested. If no devices show a difference of a few bits, then a full device failure is likely. In this case a BIST (e.g., reading and writing to the device under test to determine if there are differences between the data read and written) can be used to determine the failing device.

In one implementation, comparing the calculated and stored AMACs 299 can indicate which memory device 204, 205 failed, while the ECC 288 can be used to correct the failed memory device 204, 205. The ECC 288 value, after XORing the remaining device data blocks 256, can be used to replace the data block of the failed device. In this case, and as illustrated in the example depiction of FIG. 3, the rows across the memory devices 204, 205 can be summed for each stored ECC 288. Furthermore, the AMAC 299 can be used to reestablish integrity via recalculating, by AMAC circuitry 275, AMACs for all the memory lines for the recovered module 202 (e.g., recalculate AMAC' 297 for all the rows on a memory device 204, 205). This recalculated value, referred to as AMAC' 297 (e.g., generated using decrypted data from each memory device 204, 205 that is used to generate a GHASH', which is encrypted to generate the AMAC' 297 as shown in FIG. 3) can be tested against the stored AMAC 299 (e.g. stored in a register 217 in the memory controller) (e.g., as shown by the equal comparison circuitry in FIG. 3). If the values of the recalculated AMACs' 297 and the stored AMACs 299 match, the memory contents are verified correct. Otherwise, a system error may be generated.

As previously discussed, some systems may utilize cryptographic MACs for memory integrity and store such cryptographic MACs in the metadata bit(s) 286 of the metadata block 290. In such as case, the metadata bit(s) 286 can provide combined ECC and integrity for the memory devices 204. However, as described above, when the metadata bits 286 are used for the case of a full device failure of the memory devices 204, the ability to provide integrity verification via the metadata bits 286 is lost and, as such, the metadata bit(s) 286 cannot be utilized for data integrity verification purposes. As such, embodiments of the disclosure provide AMAC circuitry 275 to generate a GHASH-based MAC that is used as validation block 295. Any integrity violations on the data blocks of devices, which are different from the device which has failed, and for which the AMAC is computed, will result in further errors in the recovered content of the failed device. This propagation of errors from the data blocks of devices to the data blocks of a different recovered device, which has previously failed, is due to the way parity-based content recovery mechanisms work, such as the MAGIC parity. Such violations are detected by using the AMAC value. The generated GHASH-based MAC (e.g., GHASH') may be blinded (i.e., encrypted) as a validation AMAC' 297 for use in integrity verification of corrected data of the memory devices 204 or 205 of memory module 202. In one embodiment, the validation AMAC' 297 may be used for integrity verification purposes upon correction of a full device failure of the memory devices 204 or 205.

In some embodiments, AMAC circuitry 275 may generate a GHASH-based MAC (e.g., GHASH') over the portions 258 (e.g., 258-1 through 258-8) of each of decrypted data blocks 260 that are part of a region of the memory devices 204 corresponding to an AMAC 299. The region(s) may include all of the memory devices 204 (e.g., as depicted in FIG. 3) or a subset of the memory devices 204, with an AMAC generated for each region. For each region, the AMAC circuitry 275 may generate a GHASH-based MAC (e.g., GHASH') over multiple cachelines of the data blocks 258 of the memory device(s) 204 of the region.

The AMAC circuitry 275 may include GF multipliers and XOR trees.

Using the GF multipliers of the AMAC circuitry 275, each data block 258 of the region is multiplied in Galois Field with a parameter H i,j. The resulting products are XORed together (e.g., via the XOR trees) in order to generate a GHASH that acts as the validation block 295. In one embodiment, the parameter H i,j is a secret constant factor which may be a secret hash key that is generated from one or more multiple random seeds, similar to an encryption key. In one embodiment, parameter H can be generated by raising the seed value to the power of (i*K+j), where i represents the cacheline in the cacheline set of the region, j is the data block in the cacheline set of the region, and K is the total number of data blocks a cacheline in the cacheline set is divided into. In one embodiment, H may be a function of a plurality of secret parameters, such as a device ID, a domain specific tweak or a random initialization vector, and may be produced by means of encryption, Galois field multiplication, diffusion and other known mathematical operations. For example, H may be produced by encrypting a device ID with a secret, random, uniformly distributed key.

The calculated AMAC' 297 may be compared to a corresponding previously-generated AMAC 299 for the region stored in memory device 205 to determine if they are equal. For instance, the AMAC 299 and the AMAC' 297 may be compared by comparator 116. If the AMACs 297, 299 are equal, it may be determined that data integrity is maintained or no data corruption has occurred for the failed memory device 204. However, if the AMACs 297, 299 are not equal, it may be determined that data integrity has been lost in the corrected data (e.g., data corruption) has occurred. In various embodiments, when a bit error or data corruption is detected, an error correction flow may be entered.

In one embodiment, when AMACs 297, 299 are generated according to regions that are less than an entirety of memory devices 204, 205 of the memory module 202, the recalculated AMAC' 297 can also be used to identify which particular device (e.g., 204-1, 204-2, . . . , 204-N) of the memory module 202 has failed. The AMAC 299 of each region can be compared to the recalculated AMAC' 297, and the AMAC' 297 that does not match the AMAC 299 can be used to indicate the particular failed device 204, 205 of the memory module 202.

As depicted in FIG. 3, there can be a set of AMACs 299 stored in memory controller storage 219, with each AMAC 299 corresponding to all the blocks in a corresponding memory device 204, 205. To identify which memory device 204, 205 failed, all the blocks in a memory device 204, 205 are totaled into an AMAC' 297 and compared with the stored AMAC 299 corresponding to the device 204, 205. If the two values match, the device did not fail, if the two values don't match the failed device is located.

Various examples of error correction flows and memory integrity verification using an AMAC are described in connection with FIGS. 4-9.

FIG. 4 illustrates an example flow 400 for storing encrypted data blocks, an encrypted error correction code, and an AMAC in accordance with certain embodiments. The various operations of the flow may be performed by any suitable circuitry, such as a controller of a host computing device, a controller of a memory module, or other components of a computing device. The example flow 400 may be representative of some or all the operations that may be executed by or implemented on one or more components of system 100 of FIG. 1 or processing flows 200, 300 of FIG. 2-FIG. 3, such as memory module 102, memory controller 110, or DE manager 112. The embodiments are not limited in this context.

At block 410, an error correction code is generated for a memory line, the memory line comprising a plurality of data blocks, wherein the error correction code comprises parity bits generated based on first portions of the plurality of data blocks of the memory line. At block 420, a metadata block corresponding to the memory line is generated, wherein the metadata block comprises the error correction code for the memory line and at least one metadata bit. At block 430, the data blocks and the metadata blocks are encoded. At block 440, an aggregate GHASH is generated corresponding to at least one region of the plurality of data blocks. At block 450, the aggregate GHASH is encrypted as an AMAC. At block 460, the encoded data blocks and the encoded metadata block are provided for storage on a memory module including the memory line. At block 470, the AMAC is provided for storage on a device separate from the memory module. In one embodiment, the AMAC may be stored in a register of a memory controller.

Some of the operations illustrated in FIG. 4 may be repeated, combined, modified or deleted where appropriate, and additional steps may also be added to the flow in various embodiments. Additionally, steps may be performed in any suitable order without departing from the scope of particular embodiments.

FIGS. 5A-5D illustrate embodiments of example flows 500, 501, 503, 505, which may be representative of operations that may be executed in various embodiments in conjunction with detection and/or correcting data read from memory, such as memory module 102 or memory module 302. The flows 500, 501, 503, 505 may be representative of some or all the operations that may be executed by or implemented on one or more components of system 100 of FIG. 1 or processing flows 200, 300 of FIG. 2-FIG. 3, such as memory module 102, memory controller 110, or DE manager 112. The embodiments are not limited in this context.

In the illustrated embodiment shown in FIG. 5A, the flow 500 may begin at block 510. At block 510, a set of encoded data blocks and an encoded data block correction are identified. The set of encoded data blocks may be associated with a memory line from a set of storage memory devices in a memory module and the set of encoded data blocks may include one encoded data block for each storage memory device in the set of storage memory devices. The encoded block correction may be identified from a management memory device in the memory module. For instance, DE manager 112 may identify the set of encoded data blocks stored in memory module 102 and associated with memory line 106. In the illustrated embodiment, the set of encoded data blocks may include one encoded data block for each storage memory device in the set of storage memory devices. For example, each of the storage memory devices 104 may be used to store one encoded data block in the set of encoded data blocks.

Continuing to block 520, a set of decoded data blocks comprising the memory line from the set of encoded data blocks and a decoded block correction from the encoded block correction may be determined. At block 530, the set of decoded data blocks may be combined into a validation block at least in part via an XOR operator.

Proceeding to block 540, the decoded block correction and the validation block correction may be compared to identify one or more bit errors in the memory line when the decoded block correction and the validation block correction are different. At block 550, the identified one or more bit errors in the memory line may be corrected using the decoded data block correction.

At decision block 560, it is determined whether the bit errors are associated with an entire device failure. If so, then flow 500 proceeds to block 570 where an AMAC corresponding to a region comprising the failed device is identified. Then, at block 580, the AMAC is utilized to verify integrity of the corrected bit errors. If, at decision block 560, it is determined that the bit errors are not associated with an entire device failure, then flow 500 proceeds to block 590 where the decoded data block correction is utilized to verify integrity of the corrected bit errors.

FIG. 5B illustrates an embodiment of an example flow 501, which may also be representative of operations that may be executed in various embodiments in conjunction with detection and/or correcting data read from memory, such as memory module 102 or memory module 302. First, in block 511, the described process of flow 501 identifies a first plurality of AMAC values computed on the data blocks of a second plurality of memory regions. Next, in block 521, the process verifies the integrity of each of the second plurality of the memory regions using a corresponding AMAC value from the first plurality of AMAC values. In this embodiment the AMAC values are not only used for verifying the integrity of recovered device content, but also for discovering that devices have failed in the first place.

Following block 521, decision block 531 performs a check on whether there is more than one integrity test failing. If this is the case flow 501 stops in block 532. In this case there are uncorrectable errors. Otherwise, if there is exactly one AMAC integrity test failing, the flow proceeds into the execution of block 542. Likewise, if there are no AMAC integrity tests failing, flow 501 returns in block 552. There are no errors or failed devices in this case.

In block 542, the AMAC value and memory region of the failing integrity test are identified. Next, in block 551, a fourth plurality of encoded data block correction values are computed. This is done for a third plurality of memory cache lines. Following this, in block 561, the process of flow 501 performs an integrity test for each memory cache line from the third plurality of the memory cache lines using a corresponding encoded data block correction value from the fourth plurality of encoded data block correction values. Subsequently, in the decision block 571, a check is made whether each integrity test performed in block 561 indicates single data block failure, and whether all failed data blocks coming from the tests of flow block 561 are of the same index as the AMAC value upon which the single failed integrity test 531 is performed. If this is not the case, flow 501 stops in block 572. There is no device failure. The process performs single block recovery using an encoded data block correction value from the fourth plurality of encoded data block correction values of 551.

Otherwise, flow 501 proceeds into block 581. In this case there is full device failure. The process performs full device recovery using at least one encoded data block correction value from the fourth plurality of encoded data block correction values of 551. Finally, in block 591, the process of flow 501 utilizes an AMAC value from the first plurality of AMAC values of 511 to verify the integrity of corrected bit errors.

Figure 5C:
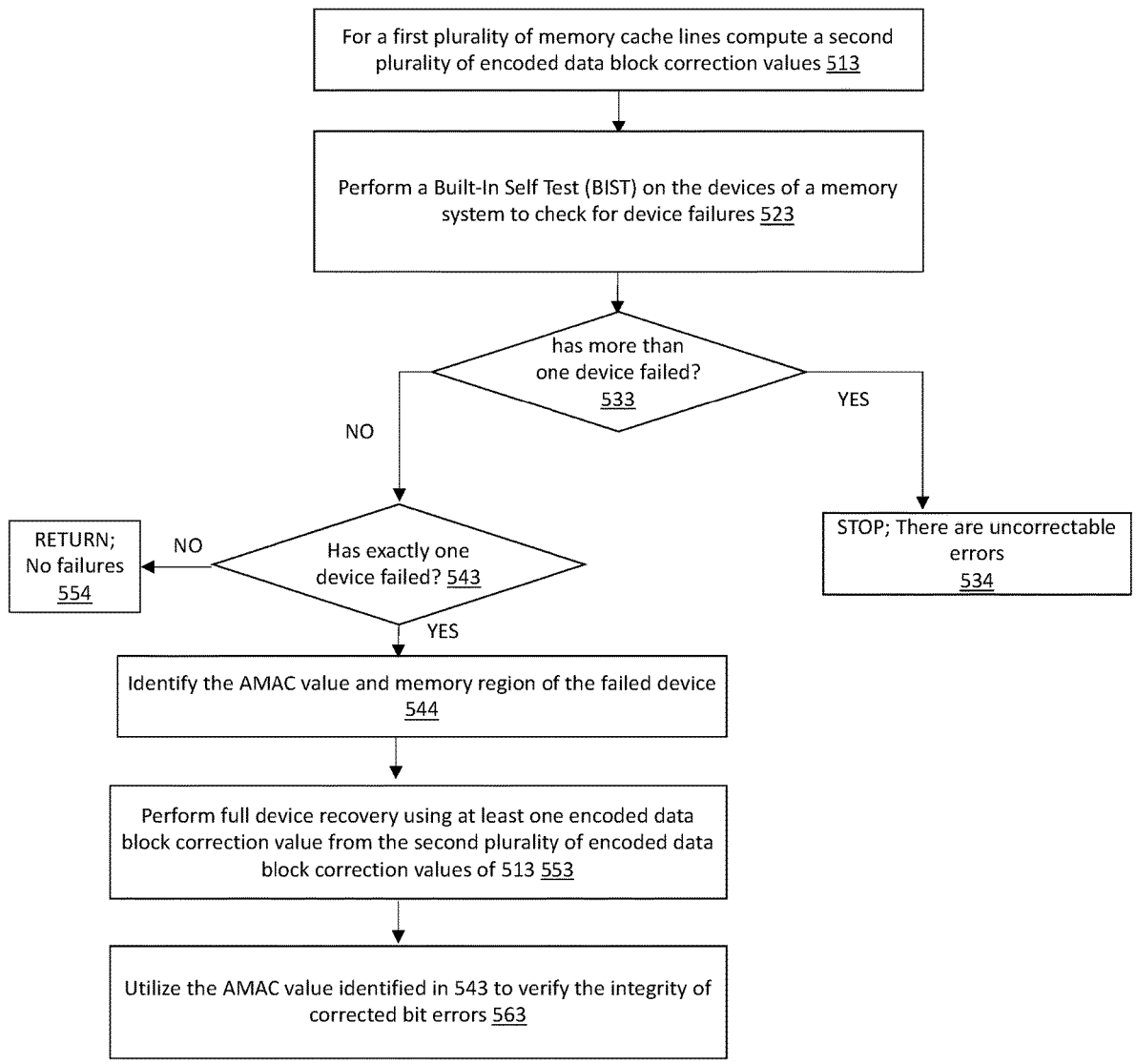

FIG. 5C illustrates an embodiment of an example flow 503, which may further be representative of operations that may be executed in various embodiments in conjunction with detection and/or correcting data read from memory, such as memory module 102 or memory module 302. In block 513, the process of flow 503 computes a second plurality of encoded data block correction values from a first plurality of memory cache lines. Then, in block 523, a Built-In Self Test (BIST) is performed on the devices of a memory system to check for device failures. Subsequently, in decision block 533 a check is made whether more than one device has failed. If this is the case, flow 503 stops in block 534. There are uncorrectable errors.

Otherwise flow 503 proceeds to decision block 543. At decision block 543, a check is made to determine whether exactly one device has failed. In this case the flow 503 proceeds into block 544. Otherwise flow 503 exits in block 554. In the latter case there are no device failures. In block 544, the process of flow 503 identifies the AMAC value and memory region of the failed device. Next, in block 553, flow 503 performs full device recovery using at least one encoded data block correction value from the second plurality of encoded data block correction values of block 513. Finally, in block 563, the process of flow 503 utilizes the AMAC value identified in 543 to verify the integrity of corrected bit errors.

FIG. 5D illustrates an embodiment of an example flow 505, which may be representative of operations that may be executed in various embodiments in conjunction with detection and/or correcting data read from memory, such as memory module 102 or memory module 302. For a first plurality of data bytes stored in memory, the process of flow 505 computes, at block 515, a second plurality of AMAC values where each of the AMAC values is computed on the same first plurality of data bytes and each of the AMAC values is computed on a different set of secret parameters. Next, in block 525, the process of flow 505 forms a hypothesis about the presence of errors in locations of as many encoded data blocks as the number of AMAC values computed in flow block 515, where encoded data blocks include bytes from the first plurality of data bytes of flow block 515.

Subsequently, from the hypothesis of flow block 525, the process of flow 505 forms, at block 535, a system of as many bit-linear equations as the number of AMAC values computed in 515, where the number of unknowns is equal to the number of equations. Such system is solved in block 545, where the process of flow 505 performs an entropy test on the values of the unknowns which are found through solving the system of flow block 535.

Next, in decision block 555, a check is made whether all the unknowns satisfy the entropy test. If this is the case, the process of flow 505 corrects, at block 565, the errors which are present and verifies the integrity of the corrected bit errors using the second plurality of AMAC values computed in flow block 515. Otherwise, a check is made whether all hypotheses have been formed. If there are more hypotheses to form, the flow 505 repeats from flow block 525. Otherwise the flow 505 exits in flow block 586.

In one implementation, the process of flow 505 shows an embodiment that extends the embodiments of FIGS. 5A, 5B and 5B, and in which the AMAC value is used for verifying integrity of, and for correcting multiple arbitrary regions of memory, where regions simultaneously have errors or contain data that have been lost. In the process of flow 505, the computed AMAC values function as "Randomized Reed Solomon" codes. With respect to "Randomized Reed Solomon" codes, the GHASH transformation, which may be employed for computing an AMAC value, is similar to the Reed Solomon encoding with the exception that it is a single bit linear combination of the input blocks and uses a single random value. Reed Solomon codes are collections of linear combinations of the input blocks which are typically numerous and use fixed parameters. Such structure is necessary for the formation of a locator polynomial, the roots of which indicate the locations of the errors that have occurred. The mathematical structure of the Reed Solomon code is shown in the equation below.

$$\text{Message} \mid RS = B_0 \mid B_1 \mid \ldots \mid B_{n-1} \mid \sum_{i=0}^{n-1} B_i \cdot a_{(0)}^{i+1} \mid \quad (C.2)$$
$$\sum_{i=0}^{n-1} B_i \cdot a_{(1)}^{i+1} \mid \ldots \mid \sum_{i=0}^{n-1} B_i \cdot a_{(k-1)}^{i+1}$$

In the equation above, parameters $a_{(j)}^i$ used by the Reed Solomon code are considered fixed and known. The embodiment of flow 505 considers that AMAC values are computed differently, as modified, randomized Reed Solomon codes. A Randomized Reed Solomon (R²S) encoding would be equal to:

$$\text{Message} \mid R^2S = B_0 \mid B_1 \mid \ldots \mid B_{n-1} \mid$$
$$G_0 + \sum_{i=0}^{n-1} B_i \cdot H_{(0)}^{i+1} \mid \ldots \mid G_{k-1} + \sum_{i=0}^{n-1} B_i \cdot H_{(k-1)}^{i+1}$$

The parameters $G_j$ and $H_{(j)}^i$ in the above equation are considered to be secret and random uniformly distributed. A plurality of AMAC values forms a Randomized Reed Solomon code. From the structure of a Randomized Reed Solomon code, it can be immediately inferred that the standard error correction procedure of Reed Solomon using Peterson's decoder is no longer applicable. However, error correction is possible, because the process of flow 505 takes as many steps as the number of the hypotheses that can be made about the location of the errors. This number is equal to $$\binom{n+k}{k}.$$

Indeed, let's assume that the errors are at locations $i_{e_0}, i_{e_1}, \ldots, i_{e_{k-1}}$, according to one hypothesis. In this case the equations coming from the definition of the code can form a system which is solvable in almost all cases. In one implementation, it can be assumed that the corrupted data is equal to $C_0|C_1| \ldots |C_{n-1}|C_n| \ldots |C_{n+k-1}$. Based on the assumption that the errors are in locations $i_{e_0}, i_{e_1}, \ldots, i_{e_{k-1}}$ the process of flow 505 forms the following system of n+k equations:

$$C_i = B_i \forall i \le n, i \notin \{i_{e_0}, i_{e_1}, \ldots, i_{e_{k-1}}\}$$
$$C_i = B_i + e_i \forall i \le n, i \in \{i_{e_0}, i_{e_1}, \ldots, i_{e_{k-1}}\}$$
$$C_i = G_{i-n} + \sum_{l=0}^{n-1} B_l \cdot H_{(i-n)}^{l+1} \forall n < i \le n+k-1, i \notin \{i_{e_0}, i_{e_1}, \ldots, i_{e_{k-1}}\}$$
$$C_i = G_{i-n} + \sum_{l=0}^{n-1} B_l \cdot H_{(i-n)}^{l+1} + e_i \forall n < i \le n+k-1,$$
$$i \in \{i_{e_0}, i_{e_1}, \ldots, i_{e_{k-1}}\}$$

The system of n+k equations has n+k unknowns i.e., the variables $B_0, \ldots, B_{n-1}$ and error values $e_0, \ldots, e_{k-1}$ and can be solved provided that its determinant is non-zero, which is in general the case as the parameters used by the randomized Reed Solomon are considered random and uniformly distributed. The system may have k non-trivial equations and can be potentially solved with reasonable compute effort. Each hypothesis from the $$\binom{n+k}{k}$$

ones results in a different set of $e_0, \ldots, e_{k-1}$ values for the error vector. Error correction works by imposing the constraint that each of the error values $e_0, \ldots, e_{k-1}$ should satisfy some entropy constraint, for example demonstrate hamming weight smaller or equal to a threshold T. As the values $G_j$ and $H_{(j)}^i$ are random and uniformly distributed the constraint should be satisfied only for the correct locations and error values.

Some of the operations illustrated in FIGS. 5A-5D may be repeated, combined, modified or deleted where appropriate, and additional steps may also be added to the flow in various embodiments. Additionally, steps may be performed in any suitable order without departing from the scope of particular embodiments.

Figure 6:
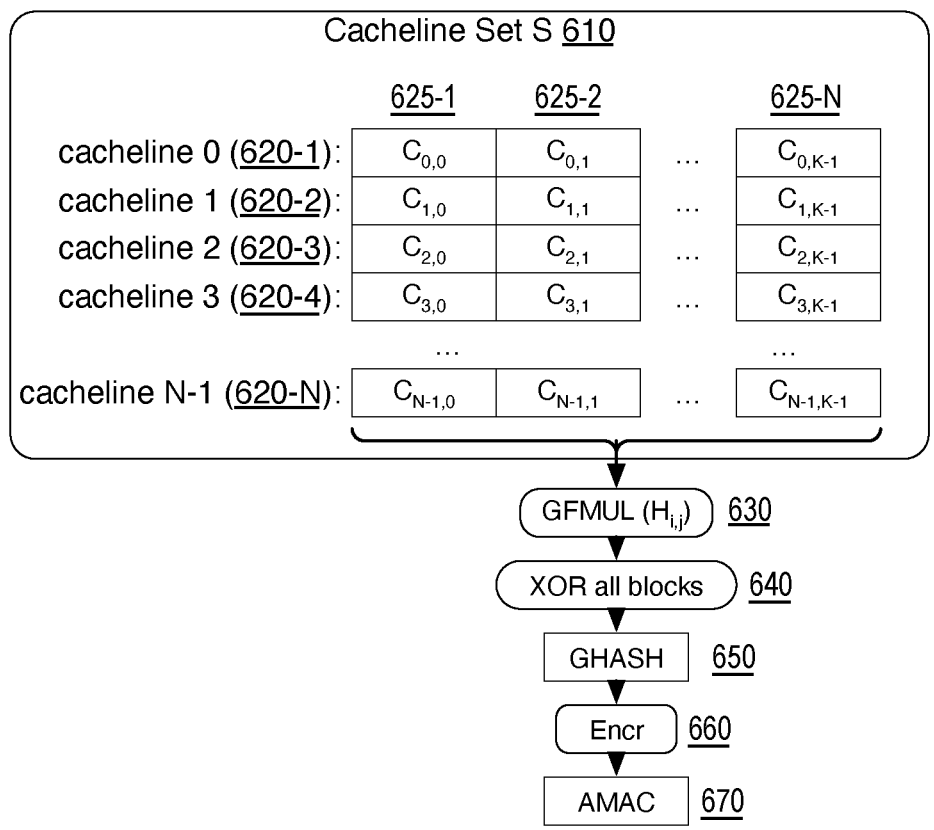
FIG. 6 is a schematic diagram of elements to generate an AMAC, according to some embodiments.

FIG. 6 illustrates a schematic diagram of a flow 600 for generating an AMAC in accordance with certain embodiments. The generation of the AMAC may occur during a write flow of a memory line (e.g., 106) to a memory module 202. In various embodiments, one or more components illustrated in FIG. 6 may be the same or similar to one or more components in FIG. 1. For instance, cacheline set 610 may be part of memory module 202 and may have any one or more characteristics of memory module 102 described in connection with FIGS. 1 and 2. In one embodiment, AMAC generator 120 of DE manager 112 of memory controller 110 may perform flow 600 for generating an AMAC.

In one embodiment, AMACs are generated over a cacheline set S 610. Cacheline set S 610 may be composed of N cachelines 620-1 (cacheline 0), 620-2 (cacheline 1), 620-3 (cacheline 2), 620-4 (cacheline 3), . . . , 620-N (cacheline N), as shown FIG. 6. Each cacheline i is divided into K data blocks 625-1, 625-2, . . . , 625-N of size M: $C_{i,0} \ldots C_{i,K-1}$. Each such data block (e.g., 625) can be represented as an element of a Galois Field $GF(2^M)$. The generated MAC 670 can be a linear combination of the plaintext blocks 625. In embodiments of the disclosure, a GHASH 650 can be used to provide the linear combination of plaintext blocks 625. However, any linear recombination method (e.g., XOR, GHASH, etc.) may be utilized in embodiments of the disclosure. Moreover, the AMAC 775 can be constructed over ciphertext or plaintext, which can be subsequently encrypted.

In one embodiment, to generate an AMAC 775, each data block $C_{i,j}$ 625 in cacheline set S 610 is multiplied in Galois Field (GF) 630 with a parameter $H_{i,j}$. The resulting products are XORed 640 together (e.g., addition in GF) in order to generate GHASH 650. The following equation represents the generation of GHASH 650:

$$GHASH = \sum_{i=0}^{N-1}\sum_{j=0}^{K-1} C_{i,j}H_{i,j}$$

In one embodiment, the parameters H can be secret hash keys that are generated from one or multiple random seeds, similarly to an encryption key. In one example implementation, the parameters H can be generated by raising the seed value to the power (iK+j), shown as follows:

$$H_{i,j} = seed^{iK+j}$$

The GHASH 650 is subsequently "blinded" (i.e., encrypted) 660 in order to generate the AMAC 670. In one embodiment, the blinding 660 may be performed using a block cipher (e.g., AES, SIMON, PRINCE, etc.) and a secret blinding key, B. The resulting AMAC 670 can be stored in sequestered memory.

Once an AMAC 670 is generated for a cacheline set 610, the AMAC 670 can be incrementally updated on writes to any one or more lines within that cacheline set 610. For incremental updates of the AMAC 670, the previously-generated AMAC and the previous data line as well as the new data line that is being updated are utilized. Embodiments do not use other cacheline data in the cacheline set 610 that is untouched. This capability of incremental updates is due to the linear nature of GHASH, which is not the case for hashing functions like SHA-3.

Figure 7:
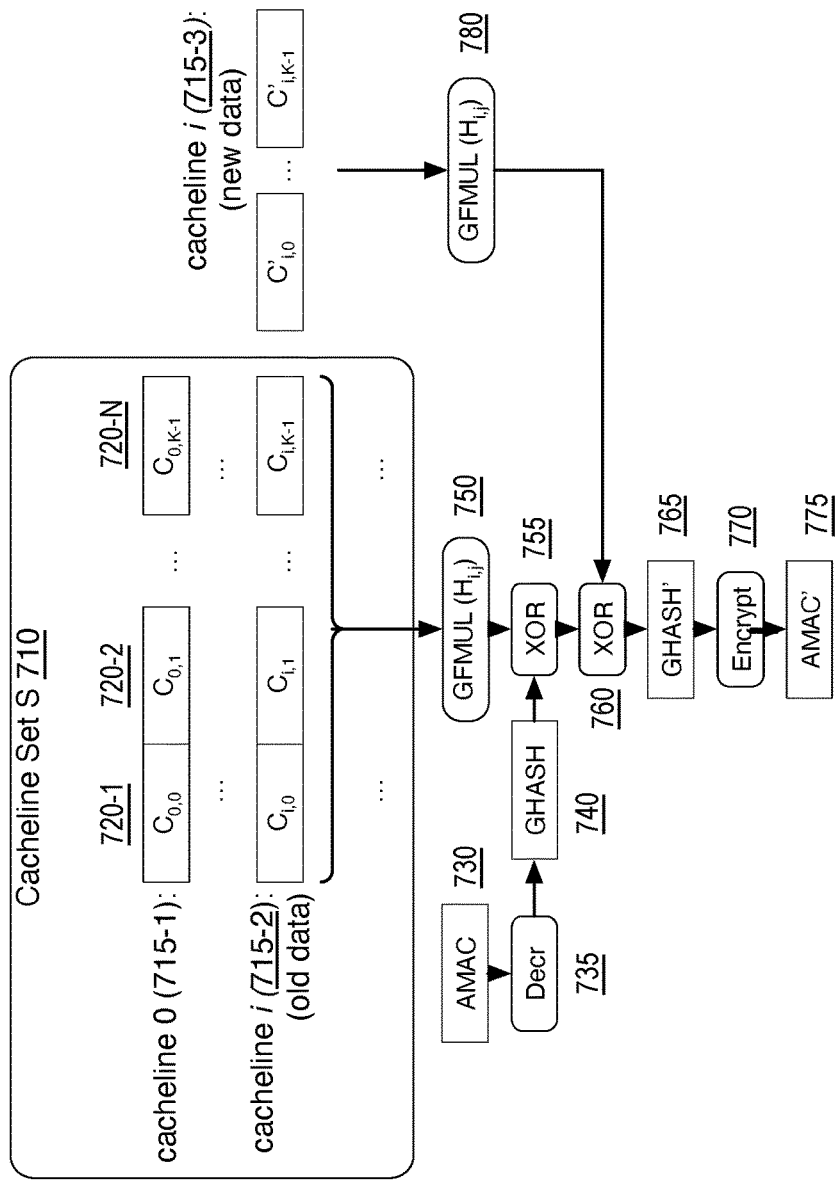
FIG. 7 is a schematic diagram of elements for updating an AMAC, according to some embodiments.

FIG. 7 illustrates a schematic diagram of a flow 700 for updating an AMAC in certain embodiments. The update of the AMAC 730 may occur during a write flow of a memory line (e.g., 106) to a memory module 202. In various embodiments, one or more components illustrated in FIG. 7 may be the same as or similar to one or more components in FIG. 1 and/or FIG. 6. For instance, cacheline set 710 may be part of memory module 202 and may have any one or more characteristics of memory module 102 described in connection with FIGS. 1 and 2. In one embodiment, AMAC generator 120 of DE manager 112 of memory controller 110 may perform flow 700 for updating an AMAC.

The update flow 700 is as follows. In one embodiment, cacheline set S 710 may be the same as cacheline set S 610 described with respect to FIG. 6 and AMAC 670 may be the same as AMAC 730. Cacheline set S 710 may be composed of N cachelines 715-1 (cacheline 0), 715-2 (cacheline i), and so on. Each cacheline i 715 is divided into K data blocks 720-1, 720-2, . . . , 720-N of size M: $C_{i,0} \ldots C_{i,K-1}$.

In one example, assume that cacheline i 715-2 of cacheline set S 710 is being updated with a new data 715-3 $\{C'_{i,0} \ldots C'_{i,K-1}\}$, as shown in FIG. 7. In one embodiment, to update AMAC 730 when cacheline i 715-2 is being updated, the previous-generated AMAC 730 is retrieved. In addition, the old (previous) cacheline data associated with cacheline i 715-2 $\{C_{i,0} \ldots C_{i,K-1}\}$ is retrieved. The previous AMAC 730 is decrypted 735 to recover the original GHASH 740. The new value MAC' 775 is then generated, for example, using GF multiplication 750, 780 and XOR 755, 760, to generate an updated GHASH' 765, that is blinded (encrypted) 770 to produce the updated AMAC' 775. An example equation for generating the updated AMAC' 775 may be as follows:

$$AMAC' = GHASH + \sum_{j=0}^{K-1}(C_{i,j} + C'_{i,j})H_{i,j}$$

FIG. 8 illustrates an example flow 800 for generating an AMAC in accordance with certain embodiments. The various operations of the flow may be performed by any suitable circuitry, such as a controller of a host computing device, a controller of a memory module, or other components of a computing device. The example flow 800 may be representative of some or all the operations that may be executed by or implemented on one or more components of system 100 of FIG. 1 or processing flows 200, 300 of FIG. 2-FIG. 3, such as memory module 102, memory controller 110, or DE manager 112. In one embodiment, the example flow 800 may be representative of the schematic diagram of flow 600 described with respect to FIG. 6. The embodiments are not limited in this context.

At block 810, a cache line set corresponding to a region of a set of memory storage devices is identified. In one embodiment, the cacheline set comprising N cache lines each divided into K data blocks. At block 820, each data block is multiplied in Galois Field with a constant factor specific to the data block. At block 830, the resulting products of the data block multiplication are XORed to generate a GHASH. At block 840, the GHASH is encrypted to generate an AMAC. Lastly, at block 850, the AMAC is provided for storage on a device separate from a memory module including the set of memory storage devices. In one embodiment, the AMAC may be stored in a register of a memory controller.

FIG. 9 illustrates an example flow 900 for updating an AMAC in accordance with certain embodiments. The various operations of the flow may be performed by any suitable circuitry, such as a controller of a host computing device, a controller of a memory module, or other components of a computing device. The example flow 800 may be representative of some or all the operations that may be executed by or implemented on one or more components of system 100 of FIG. 1 or processing flows 200, 300 of FIG. 2-FIG. 3, such as memory module 102, memory controller 110, or DE manager 112. In one embodiment, the example flow 700 may be representative of the schematic diagram of flow 700 described with respect to FIG. 7. The embodiments are not limited in this context.

At block 905, an update is received to a cacheline ("updated cacheline) in a cache line set corresponding to a region of a set of memory storage devices. In one embodiment, the cacheline set includes N cache lines each divided into K data blocks. At block 910, an AMAC corresponding to the cache line set is retrieved. In one implementation, the AMAC was previously generated for the cacheline set prior to the update to the cache line. At block 915, the AMAC is decrypted to recover GHASH. At block 920, previous cache line data corresponding to the cacheline is retrieved prior to the update. At block 925, original data blocks of previous cacheline are multiplied in Galois Field with constant factors specific to the data blocks.

At block 930, the resulting products of the original data blocks multiplication are XORed with the recovered GHASH to generate incremental GHASH. At block 935, updated data blocks of the updated cacheline are multiplied in Galois Field with constant factors specific to the data blocks. At block 940, the resulting products of the updated data blocks multiplication are XORed with the incremental GHASH to generate updated GHASH. At block 945, the updated GHASH is encrypted to generate an updated AMAC. At block 950, the updated AMAC is provided for storage on a device separate from a memory module including the set of memory storage devices. In one embodiment, the AMAC may be stored in a register of a memory controller.

In embodiments of the disclosure, the AMAC may be utilized for a variety of purposes. In one example, in the context of MKTME, there can be multiple cryptographic domain separations using different cryptographic keys. In one usage, this may be applied in virtualization to multiple virtual machine (VMs), where one VM is encrypted with one VM key, while a second VM is encrypted using a different VM key. Furthermore, binding the integrity to the domain allows detection of cross-domain attacks, where a virtual machine manager (VMM) or VM may try to corrupt another VMs data. However, if the VMM or VM does not have the other VM key, it may be able to write data (corruption), which is subsequently detected when the target VM reads the same data (using a different key).

As discussed above, one example usage of the AMAC is to validate the integrity of the data when the old (previous) MAC is repurposed to data recovery in device failures (e.g., in the case of combined ECC and MAC). On device failures, one common approach is to perform data recovery and sparing, where the failed device data is first recovered (in this case, using the per-cacheline GHASH) and once the data is recovered, it can be moved to another bank or device. The ramifications of this move is that the second device has less capacity than before, which in some usages may reduce either the RAS capability, MAC strength, or reduction in some other feature or capability. However, if malicious software within the VMM or one VM writes to the second VM, at some stage prior to the DDR device failure, generating a GHASH, and a chip failure repurposes the GHASH for data recovery, the MAC contribution of the GHASH is lost. At this point, the data may be consumed legitimately by the target VM, as there is no MAC check.

By providing a low overhead 'second aggregate MAC' (i.e., the AMAC of embodiments of the disclosure), the data integrity over a larger set of data blocks can be still checked to ensure there is no cross domain corruption. This check is utilized when entering sparing mode, where each of the larger set of cache lines should be recovered anyway. As part of the recovery and rebalancing process the AMAC of embodiments can be computed incrementally as each cache line is recovered and the total AMAC compared with the reference to validate data integrity. This provides assurance to the MKTME and associated usage frameworks that data integrity is preserved at all times, even through device failures where the GHASH is repurposed for data recovery.

After sparing, the aggregate GHASH (and AMAC) may continue to be used or discarded, if a new individual MAC over each line is computed and stored in some other available memory area (e.g. sequestered or redundant memory (through sparing).

Another example usage of the AMAC in embodiments of the disclosure is to support stronger initialization vectors (IVs). The AMAC of embodiments can be used to support the use of strong IVs which, one the one hand do not utilize binding with separately stored temporal information (e.g., anti-replay counters), and on the other hand do not violate the IV uniqueness requirement of standards like GCM-GMAC.

For the generation of the IV, embodiments of the disclosure compute an IV value from a memory address value, as well as subsets of bits of the input ciphertext. The input ciphertext may be, for instance, the output of a memory encryption engine, and is the same ciphertext used for computing the GHASH. In one embodiment, the input ciphertext may be produced by mixing all 128 bits of each plaintext block.

In one embodiment, the process is as follows. Let the ciphertext blocks, defined as arrays of bits be:

$$C_0[0:127], C_1[0:127], C_2[0:127], \ldots$$

As each bit of the ciphertext already carries information from all bits of the corresponding plaintext block, it is sufficient to take a portion of ciphertext bits from each block to form the IV.

For example, if 8 bits are taken from each block, and the number of blocks is 4, then a 32-bit second preimage resistance requirement can be met. In other embodiments, a different number of bits may be chosen.

The IV formed in this manner is:

$$IV = (C_0[0:7] | C_1[0:7] | C_2[0:7]) + A$$

where '|' refers to concatenation and A is the memory address associated with IV. The address may be bound to the IV value, not only via GF(2) addition, but via other mathematical operations that include integer addition, multiplication, and concatenation. In one embodiment, the IV may be further encrypted using AES as specified in SP-800-38D and is XOR-ed with the parity P. The bits chosen for the generation of the IV can be at any positions of the ciphertext. For instance, if the statistical properties of errors are known, the bits chosen can be those with the least probability to be altered.

This embodiment cannot correct the specific bits from the ciphertext that participate in the IV generation process but can correct all other bits. For example, if 8 bits are chosen from each block, the embodiment can correct errors in 480 out of 512 bits, provided that errors are inside one device. The proposed generation process limits soft error correcting capability (e.g., to 93% if errors are uniform) but uses a fully standard compliant GMAC that satisfies the IV uniqueness requirement (or a stronger MAC for other output lengths such as 64 bits in any case). As the encrypted IV is generated from all bits of the plaintext input through a network of pseudo-random permutations (for example, the memory encryption engine and the IV encryption engine) the standard's uniqueness requirement is met.

Full device recovery in this embodiment can be accomplished as follows: begin by replacing the bits in the failed device that participated in the IV generation process by some arbitrary value. In one example, assume that the number of such bits is 8. In this example, there are 256 possible values for these bits. For example, the value 0x01 may be chosen. This hypothesis results in an IV value which, after encryption, is XOR-ed with the GMAC value. If the guess is correct, then the parity P is the linear combination of all correct block values, multiplied with powers of the hash key H. In this case, the reconstructed content of the failed device is the correct one and the 8 bits should match with the hypothesis 0x01. If, however, the guess is incorrect, the encrypted IV can be an almost random 128 bit value. This 128 bit value can be XOR-ed again with the GMAC value, and the resulting GF combination is an almost random 128 bit value, resulting in an almost random, incorrect, 128-bit device block.

As each 8-bit guess typically returns a different recovered block, only the correct hypothesis can match with the returned recovered 8 bits in most cases. Collisions are observed with probability 1/256, where 8 bits are chosen per block. Similarly, device recovery is possible with probability equal to 1-1/256. In this variant there is some probabilistic aspect to the device recovery process. Device recovery is no longer a deterministic process but is successful with probability 1-1/256 or 99.6%. The AMAC of embodiments is used in this case to select between alternate equally valid cache line corrections those cache line corrections that match with the computed AMAC tag.

Embodiments of the disclosure that support stronger IVs can operate as follows: An IV is formed from bits of the ciphertext that is being authenticated as stated above; in the case of device failure, the corresponding cache line content is corrected for each device row whenever possible; in the case of corrections that involve a plurality of alternate equally possible corrected cache lines, all possibilities are identified and marked by the algorithm; and at the end of the process a combination of corrected cache lines is selected from the set of all possible choices, comprising both determined corrected cache lines as well as corrected cache lines from equally possible choices that match with the computed AMAC.

Figure 10:
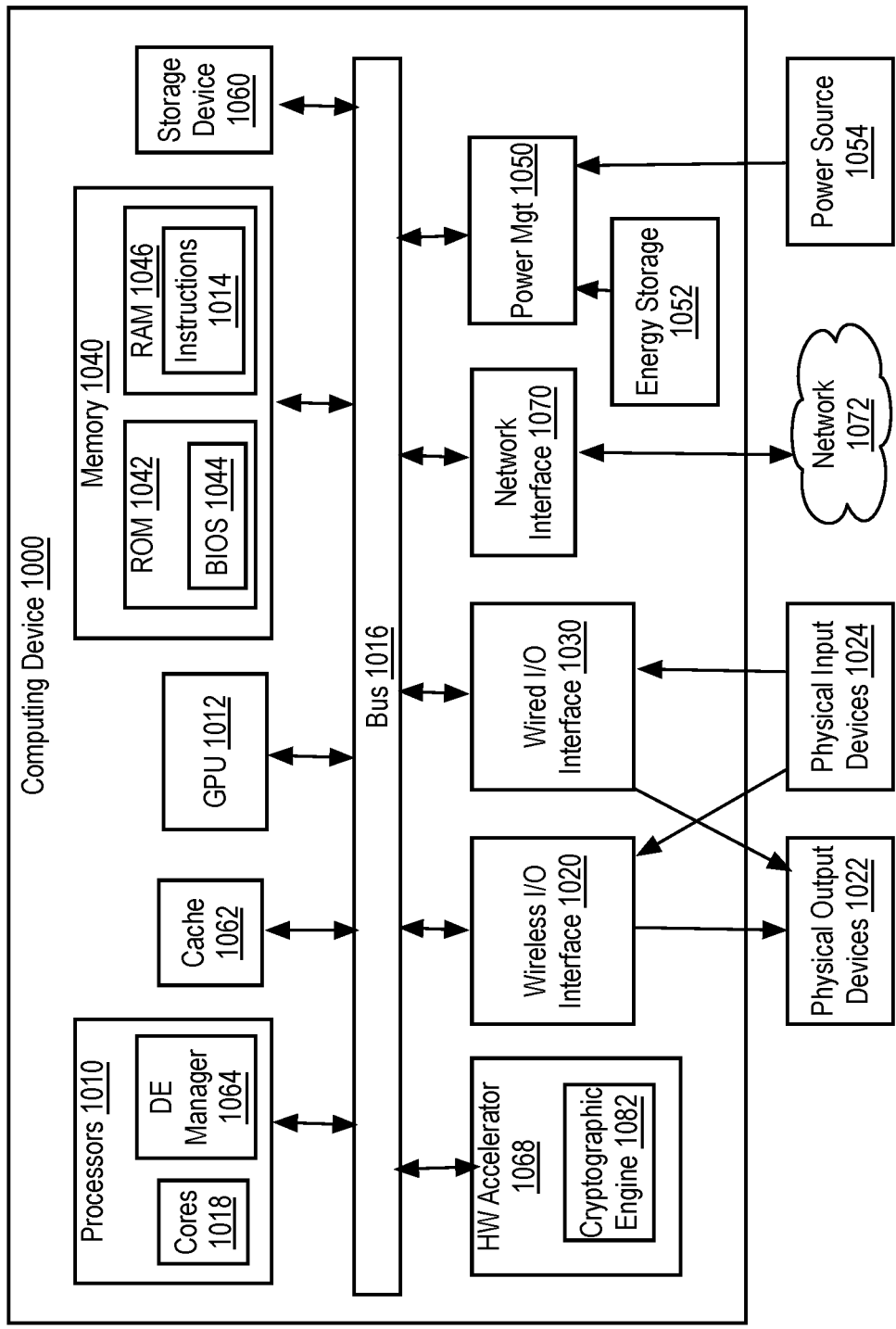
FIG. 10 is a schematic diagram of an illustrative electronic computing device to enable an aggregate GHASH-based message authentication code (AMAC) over multiple cachelines with incremental updates according to some embodiments.

FIG. 10 is a schematic diagram of an illustrative electronic computing device to enable enhanced protection against adversarial attacks according to some embodiments. In some embodiments, the computing device 1000 includes one or more processors 1010 including one or more processors cores 1018 and DE manager 1064, such as DE manager 112 described with respect to FIG. 1. In some embodiments, the computing device 1000 includes a hardware accelerator 1068, the hardware accelerator including a cryptographic engine 1082. In some embodiments, the computing device is to provide aggregate GHASH-based MAC over multiple cachelines with incremental updates, as provided in FIGS. 1-9.

The computing device 1000 may additionally include one or more of the following: cache 1062, a graphical processing unit (GPU) 1012 (which may be the hardware accelerator in some implementations), a wireless input/output (I/O) interface 1020, a wired I/O interface 1030, memory circuitry 1040, power management circuitry 1050, non-transitory storage device 1060, and a network interface 1070 for connection to a network 1072. The following discussion provides a brief, general description of the components forming the illustrative computing device 1000. Example, non-limiting computing devices 1000 may include a desktop computing device, blade server device, workstation, or similar device or system.

In embodiments, the processor cores 1018 are capable of executing machine-readable instruction sets 1014, reading data and/or instruction sets 1014 from one or more storage devices 1060 and writing data to the one or more storage devices 1060. Those skilled in the relevant art will appreciate that the illustrated embodiments as well as other embodiments may be practiced with other processor-based device configurations, including portable electronic or hand-held electronic devices, for instance smartphones, portable computers, wearable computers, consumer electronics, personal computers ("PCs"), network PCs, minicomputers, server blades, mainframe computers, and the like.

The processor cores 1018 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 1000 includes a bus or similar communications link 1016 that communicably couples and facilitates the exchange of information and/or data between various system components including the processor cores 1018, the cache 1062, the graphics processor circuitry 1012, one or more wireless I/O interfaces 1020, one or more wired I/O interfaces 1030, one or more storage devices 1060, and/or one or more network interfaces 1070. The computing device 1000 may be referred to in the singular herein, but this is not intended to limit the embodiments to a single computing device 1000, since in certain embodiments, there may be more than one computing device 1000 that incorporates, includes, or contains any number of communicably coupled, collocated, or remote networked circuits or devices.

The processor cores 1018 may include any number, type, or combination of currently available or future developed devices capable of executing machine-readable instruction sets.

The processor cores 1018 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks are not described in further detail herein, as they should be understood by those skilled in the relevant art. The bus 1016 that interconnects at least some of the components of the computing device 1000 may employ any currently available or future developed serial or parallel bus structures or architectures.

The system memory 1040 may include read-only memory ("ROM") 1042 and random access memory ("RAM") 1046. A portion of the ROM 1042 may be used to store or otherwise retain a basic input/output system ("BIOS") 1044. The BIOS 1044 provides basic functionality to the computing device 1000, for example by causing the processor cores 1018 to load and/or execute one or more machine-readable instruction sets 1014. In embodiments, at least some of the one or more machine-readable instruction sets 1014 cause at least a portion of the processor cores 1018 to provide, create, produce, transition, and/or function as a dedicated, specific, and particular machine, for example a word processing machine, a digital image acquisition machine, a media playing machine, a gaming system, a communications device, a smartphone, or similar.

The computing device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The computing device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include, but are not limited to, universal serial bus (USB), IEEE 1394 ("Fire-Wire"), and similar.

The computing device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 1060 may include one or more removable storage devices, such as one or more flash drives, flash memories, flash storage units, or similar appliances or devices capable of communicable coupling to and decoupling from the computing device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor cores 1018 and/or graphics processor circuitry 1012 and/or one or more applications executed on or by the processor cores 1018 and/or graphics processor circuitry 1012. In some instances, one or more data storage devices 1060 may be communicably coupled to the processor cores 1018, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or Wi-Fi®, etc.).

Processor-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor cores 1018 and/or graphics processor circuitry 1012.

The computing device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the computing device 1000. The power source 1054 may include, but is not limited to, a solar power system, a commercial electric grid, a portable generator, an external energy storage device, or any combination thereof.

For convenience, the processor cores 1018, the graphics processor circuitry 1012, the wireless I/O interface 1020, the wired I/O interface 1030, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor cores 1018 and/or the graphics processor circuitry 1012. In some embodiments, all or a portion of the bus 1016 may be omitted and the components are coupled directly to each other using suitable wired or wireless connections.

The following examples pertain to further embodiments. Example 1 is an apparatus to facilitate aggregate GHASH-based message authentication code (MAC) over multiple cachelines with incremental updates. The system of Example 1 comprises a controller comprising circuitry, the controller to: generate an error correction code for a memory line, the memory line comprising a plurality of first data blocks; generate a metadata block corresponding to the memory line, the metadata block comprising the error correction code for the memory line and at least one metadata bit; generate an aggregate GHASH corresponding to a region of memory comprising a cacheline set comprising at least the memory line; encode the first data blocks and the metadata block; encrypt the aggregate GHASH as an aggregate message authentication code (AMAC); provide the encoded first data blocks and the encoded metadata block for storage on a memory module comprising the memory line; and provide the AMAC for storage on the memory module or on a device separate from the memory module.

In Example 2, the subject matter of Example 1 can optionally include wherein generating the aggregate GHASH comprises multiplication of the plurality of first data blocks in a Galois Field with secret constant factors specific to each of the plurality of first data blocks, and wherein the secret constant factors are generated from a random seed raised to a power based on positions of the plurality of first data blocks in the cacheline set. In Example 3, the subject matter of any one of Examples 1-2 can optionally include wherein the region of memory corresponds to an entire set of memory devices in the memory module.

In Example 4, the subject matter of any one of Examples 1-3 can optionally include wherein the region of memory corresponds to an individual memory device in the memory module. In Example 5, the subject matter of any one of Examples 1-4 can optionally include wherein the cacheline set comprises a plurality of cachelines divided into a plurality of data blocks comprising at least the plurality of first data blocks. In Example 6, the subject matter of any one of Examples 1-5 can optionally include wherein the AMAC is used for integrity verification purposes in response to a full device failure of a memory device in the memory module, wherein the AMAC represents a total integrity of a number of memory lines and is used to re-total an associated set of memory lines of the memory module and to verify lost device data was correctly recovered.

In Example 7, the subject matter of any one of Examples 1-6 can optionally include wherein the AMAC is used to support secure initialization vectors (IVs). In Example 8, the subject matter of any one of Examples 1-7 can optionally include wherein generating the aggregate GHASH further comprises: recovering a previous aggregate GHASH from a previous AMAC; retrieving previous data for the memory line; multiplying previous data blocks corresponding to the previous data in a Galois Field with secret constant factors corresponding to the previous data blocks; performing an exclusive-or of first resulting products of the multiplying the previous data blocks with the previous aggregate GHASH to generate an incremental GHASH; multiplying the plurality of first data blocks in the Galois Field with the secret constant factors specific to each of the plurality of first data blocks; and performing an exclusive-or of second resulting products of the multiplying the plurality of first data blocks with the incremental GHASH to generate the aggregate GHASH. In Example 9, the subject matter of any one of Examples 1-8 can optionally include wherein encrypting the aggregate GHASH comprising applying a block cipher and a secret blinding key.

In Example 10, the subject matter of any one of Examples 1-9 can optionally include wherein the controller is further to: identify a first plurality of AMAC values comprising at least the AMAC, wherein the first plurality of AMAC values computed on data blocks of a second plurality of memory regions; determine that there is one failing integrity test in response to verifying an integrity of each of the second plurality of memory regions using the first plurality of AMAC values; identify a target AMAC value of the plurality of AMAC values and a memory region corresponding to the failing integrity test; compute, for a third plurality of memory cache lines, a fourth plurality of encoded data blocks correction values; perform an integrity test for each of the memory cache lines of the third plurality of memory cache lines using a corresponding encoded data block correction value from the fourth plurality of encoded data block correction values; and determine whether there is a full device failure based on results of each of the integrity tests.

In Example 11, the subject matter of any one of Examples 1-10 can optionally include wherein the controller is further to: compute, for a first plurality of memory cache lines, a second plurality of encoded data block correction values; perform a built-in self test (BIST) on devices of the memory module to check for device failures; in response to the BIST determining that a failed device of the devices has failed, identify a target AMAC value and a memory region corresponding to the failed device; perform full device recovery of the failed device using at least one encoded data block correction value from the second plurality of encoded data block correction values; and verify integrity of the corrected bit errors using the identified target AMAC value.

In Example 12, the subject matter of any one of Examples 1-11 can optionally include wherein the controller is further to: compute, for a first plurality of data bytes stored in the memory module, a second plurality of AMAC values comprising at least the AMAC, wherein each of the AMAC values is computed on the first plurality of data bytes and is computed on a different set of secret parameters; generate a hypothesis about the presence of bit errors in locations of encoded data blocks comprising the first plurality of data bytes; generate bit-linear equations based on the generated hypothesis, wherein a number of unknowns in the bit-linear equations is equal to a number of the bit-linear equations; solve the bit-linear equations to determine values of the unknowns; perform an entropy test on the determined values of the unknowns; and in response to determining that the values of the unknowns satisfies the entropy test, correct the bit errors and verify integrity of the corrected bit errors using the second plurality of AMAC values.

Example 13 is a non-transitory machine readable storage medium for facilitating aggregate GHASH-based message authentication code (MAC) over multiple cachelines with incremental updates. The non-transitory machine readable storage medium of Example 13 having stored thereon executable computer program instructions that, when executed by one or more processors, cause the one or more processors to perform operations comprising: generating an error correction code for a memory line, the memory line comprising a plurality of first data blocks; generating a metadata block corresponding to the memory line, the metadata block comprising the error correction code for the memory line and at least one metadata bit; generating an aggregate GHASH corresponding to a region of memory comprising a cacheline set comprising at least the memory line; encoding the first data blocks and the metadata block; encrypting the aggregate GHASH as an aggregate message authentication code (AMAC); providing the encoded first data blocks and the encoded metadata block for storage on a memory module comprising the memory line; and providing the AMAC for storage on a device separate from the memory module.

In Example 14, the subject matter of Example 13 can optionally include wherein generating the aggregate GHASH comprises multiplication of the plurality of first data blocks in a Galois Field with secret constant factors specific to each of the plurality of first data blocks. In Example 15, the subject matter of Examples 13-14 can optionally include wherein the secret constant factors are generated from a random seed raised to a power based on positions of the plurality of first data blocks in the cacheline set. In Example 16, the subject matter of Examples 13-15 can optionally include wherein the region of memory corresponds to at least one of an entire set of memory devices in the memory module or an individual memory device in the memory module.

In Example 17, the subject matter of Examples 13-16 can optionally include wherein the AMAC is used for integrity verification purposes in response to a full device failure of a memory device in the memory module, and wherein the AMAC represents a total integrity of a number of memory lines and is used to re-total an associated set of memory lines of the memory module and to verify lost device data was correctly recovered.

In Example 18, the subject matter of Examples 13-17 can optionally include wherein the instructions for generating the aggregate GHASH further include instructions for: recovering a previous aggregate GHASH from a previous AMAC; retrieving previous data for the memory line; multiplying previous data blocks corresponding to the previous data in a Galois Field with secret constant factors corresponding to the previous data blocks; performing an exclusive-or of first resulting products of the multiplying the previous data blocks with the previous aggregate GHASH to generate an incremental GHASH; multiplying the plurality of first data blocks in the Galois Field with the secret constant factors specific to each of the plurality of first data blocks; and performing an exclusive-or of second resulting products of the multiplying the plurality of first data blocks with the incremental GHASH to generate the aggregate GHASH. In Example 19, the subject matter of Examples 13-18 can optionally include wherein encrypting the aggregate GHASH comprising applying a block cipher and a secret blinding key.

Example 20 is a method for facilitating aggregate GHASH-based message authentication code (MAC) over multiple cachelines with incremental updates. The method of Example 20 can include generating, by a controller comprising circuitry, an error correction code for a memory line, the memory line comprising a plurality of first data blocks; generating a metadata block corresponding to the memory line, the metadata block comprising the error correction code for the memory line and at least one metadata bit; generating an aggregate GHASH corresponding to a region of memory comprising a cacheline set comprising at least the memory line; encoding the first data blocks and the metadata block; encrypting the aggregate GHASH as an aggregate message authentication code (AMAC); providing the encoded first data blocks and the encoded metadata block for storage on a memory module comprising the memory line; and providing the AMAC for storage on a device separate from the memory module.

In Example 21, the subject matter of Example 20 can optionally include wherein the region of memory corresponds to at least one of an entire set of memory devices in the memory module or an individual memory device in the memory module. In Example 22, the subject matter of Examples 20-21 can optionally include wherein the AMAC is used for integrity verification purposes in response to a full device failure of a memory device in the memory module, and wherein the AMAC represents a total integrity of a number of memory lines and is used to re-total an associated set of memory lines of the memory module and to verify lost device data was correctly recovered.

In Example 23, the subject matter of Examples 20-22 can optionally include wherein generating the aggregate GHASH further comprises: recovering a previous aggregate GHASH from a previous AMAC; retrieving previous data for the memory line; multiplying previous data blocks corresponding to the previous data in a Galois Field with secret constant factors corresponding to the previous data blocks; performing an exclusive-or of first resulting products of the multiplying the previous data blocks with the previous aggregate GHASH to generate an incremental GHASH; multiplying the plurality of first data blocks in the Galois Field with the secret constant factors specific to each of the plurality of first data blocks; and performing an exclusive-or of second resulting products of the multiplying the plurality of first data blocks with the incremental GHASH to generate the aggregate GHASH.

In Example 24, the subject matter of Examples 20-23 can optionally include identifying a first plurality of AMAC values comprising at least the AMAC, wherein the first plurality of AMAC values computed on data blocks of a second plurality of memory regions; determining that there is one failing integrity test in response to verifying an integrity of each of the second plurality of memory regions using the first plurality of AMAC values; identifying a target AMAC value of the plurality of AMAC values and a memory region corresponding to the failing integrity test; computing, for a third plurality of memory cache lines, a fourth plurality of encoded data blocks correction values; performing an integrity test for each of the memory cache lines of the third plurality of memory cache lines using a corresponding encoded data block correction value from the fourth plurality of encoded data block correction values; and determining whether there is a full device failure based on results of each of the integrity tests.

In Example 25, the subject matter of Examples 20-24 can optionally include computing, for a first plurality of data bytes stored in the memory module, a second plurality of AMAC values comprising at least the AMAC, wherein each of the AMAC values is computed on the first plurality of data bytes and is computed on a different set of secret parameters; generating a hypothesis about the presence of bit errors in locations of encoded data blocks comprising the first plurality of data bytes; generating bit-linear equations based on the generated hypothesis, wherein a number of unknowns in the bit-linear equations is equal to a number of the bit-linear equations; solving the bit-linear equations to determine values of the unknowns; performing an entropy test on the determined values of the unknowns; and in response to determining that the values of the unknowns satisfies the entropy test, correcting the bit errors and verify integrity of the corrected bit errors using the second plurality of AMAC values.

Example 26 is an apparatus for facilitating aggregate GHASH-based message authentication code (MAC) over multiple cachelines with incremental updates according to implementations of the disclosure. The apparatus of Example 26 can comprise means for generating, by a controller comprising circuitry, an error correction code for a memory line, the memory line comprising a plurality of first data blocks; means for generating a metadata block corresponding to the memory line, the metadata block comprising the error correction code for the memory line and at least one metadata bit; means for generating an aggregate GHASH corresponding to a region of memory comprising a cacheline set comprising at least the memory line; encoding the first data blocks and the metadata block; means for encrypting the aggregate GHASH as an aggregate message authentication code (AMAC); means for providing the encoded first data blocks and the encoded metadata block for storage on a memory module comprising the memory line; and means for providing the AMAC for storage on a device separate from the memory module. In Example 27, the subject matter of Example 26 can optionally include the apparatus further configured to perform the method of any one of the Examples 21 to 25.

Example 28 is at least one machine readable medium comprising a plurality of instructions that in response to being executed on a computing device, cause the computing device to carry out a method according to any one of Examples 20-25. Example 29 is an apparatus for facilitating aggregate GHASH-based message authentication code (MAC) over multiple cachelines with incremental updates, configured to perform the method of any one of Examples 20-25. Example 30 is an apparatus for facilitating aggregate GHASH-based message authentication code (MAC) over multiple cachelines with incremental updates comprising means for performing the method of any one of claims 20 to 25. Specifics in the Examples may be used anywhere in one or more embodiments.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A system comprising:
a controller comprising circuitry, the controller to:
generate a metadata block corresponding to a memory line, the metadata block comprising an error correction code for the memory line and at least one metadata bit;
generate an aggregate GHASH corresponding to a region of memory comprising a cacheline set comprising at least the memory line;
encrypt the aggregate GHASH as an aggregate message authentication code (AMAC); and
provide the AMAC, encoded versions of first data blocks, and an encoded version of the metadata block for storage on a memory module comprising the memory line.

2. The system of claim 1, wherein generating the aggregate GHASH comprises multiplication of the first data blocks in a Galois Field with secret constant factors specific to each of the first data blocks, and wherein the secret constant factors are generated from a random seed raised to a power based on positions of the first data blocks in the cacheline set.

3. The system of claim 1, wherein the region of memory corresponds to an entire set of memory devices in the memory module.

4. The system of claim 1, wherein the region of memory corresponds to an individual memory device in the memory module.

5. The system of claim 1, wherein the cacheline set comprises a plurality of cachelines divided into a plurality of second data blocks comprising at least the first data blocks.

6. The system of claim 1, wherein the AMAC is used for integrity verification purposes in response to a full device failure of a memory device in the memory module, wherein the AMAC represents a total integrity of a number of memory lines and is used to re-total an associated set of memory lines of the memory module and to verify lost device data was correctly recovered.

7. The system of claim 1, wherein the AMAC is used to support secure initialization vectors (IVs).

8. The system of claim 1, wherein generating the aggregate GHASH further comprises:
recovering a previous aggregate GHASH from a previous AMAC;
retrieving previous data for the memory line;
multiplying previous data blocks corresponding to the previous data in a Galois Field with secret constant factors corresponding to the previous data blocks;
performing an exclusive-or of first resulting products of the multiplying the previous data blocks with the previous aggregate GHASH to generate an incremental GHASH;
multiplying the first data blocks in the Galois Field with the secret constant factors specific to each of the first data blocks; and performing an exclusive-or of second resulting products of the multiplying the first data blocks with the incremental GHASH to generate the aggregate GHASH.

9. The system of claim 1, wherein encrypting the aggregate GHASH comprising applying a block cipher and a secret blinding key.

10. The system of claim 1, wherein the controller is further to:
identify a first plurality of AMAC values comprising at least the AMAC, wherein the first plurality of AMAC values computed on data blocks of a second plurality of memory regions;
determine that there is one failing integrity test in response to verifying an integrity of each of the second plurality of memory regions using the first plurality of AMAC values;
identify a target AMAC value of the first plurality of AMAC values and a memory region corresponding to the failing integrity test;
compute, for a third plurality of memory cache lines, a fourth plurality of encoded data blocks correction values;
perform an integrity test for each of the memory cache lines of the third plurality of memory cache lines using a corresponding encoded data block correction value from the fourth plurality of encoded data block correction values; and
determine whether there is a full device failure based on results of each of the integrity tests.

11. The system of claim 1, wherein the controller is further to:
compute, for a first plurality of memory cache lines, a second plurality of encoded data block correction values;
perform a built-in self test (BIST) on devices of the memory module to check for device failures;
in response to the BIST determining that a failed device of the devices has failed, identify a target AMAC value and a memory region corresponding to the failed device;
perform full device recovery of the failed device using at least one encoded data block correction value from the second plurality of encoded data block correction values; and
verify integrity of corrected bit errors using the identified target AMAC value.

12. The system of claim 1, wherein the controller is further to:
compute, for a first plurality of data bytes stored in the memory module, a second plurality of AMAC values comprising at least the AMAC, wherein each of the second plurality of AMAC values is computed on the first plurality of data bytes and is computed on a different set of secret parameters;
generate a hypothesis about a presence of bit errors in locations of encoded data blocks comprising the first plurality of data bytes;
generate bit-linear equations based on the generated hypothesis, wherein a number of unknowns in the bit-linear equations is equal to a number of the bit-linear equations;
solve the bit-linear equations to determine values of the unknowns;
perform an entropy test on the determined values of the unknowns; and
in response to determining that the values of the unknowns satisfies the entropy test, correct the bit errors and verify integrity of corrected bit errors using the second plurality of AMAC values.

13. A non-transitory computer-readable storage medium having stored thereon executable computer program instructions that, when executed by one or more processors, cause the one or more processors to perform operations comprising:
generating a metadata block corresponding to a memory line, the metadata block comprising an error correction code for the memory line and at least one metadata bit;
generating an aggregate GHASH corresponding to a region of memory comprising a cacheline set comprising at least the memory line;
encrypting the aggregate GHASH as an aggregate message authentication code (AMAC); and
providing the AMAC, encoded versions of first data blocks, and an encoded version of the metadata block for storage on a memory module comprising the memory line.

14. The non-transitory computer-readable storage medium of claim 13, wherein generating the aggregate GHASH comprises multiplication of the first data blocks in a Galois Field with secret constant factors specific to each of the first data blocks.

15. The non-transitory computer-readable storage medium of claim 14, wherein the secret constant factors are generated from a random seed raised to a power based on positions of the first data blocks in the cacheline set.

16. The non-transitory computer-readable storage medium of claim 13, wherein the region of memory corresponds to at least one of an entire set of memory devices in the memory module or an individual memory device in the memory module.

17. The non-transitory computer-readable storage medium of claim 13, wherein the AMAC is used for integrity verification purposes in response to a full device failure of a memory device in the memory module, and wherein the AMAC represents a total integrity of a number of memory lines and is used to re-total an associated set of memory lines of the memory module and to verify lost device data was correctly recovered.

18. The non-transitory computer-readable storage medium of claim 13, wherein the instructions for generating the aggregate GHASH further include instructions for:
recovering a previous aggregate GHASH from a previous AMAC;
retrieving previous data for the memory line;
multiplying previous data blocks corresponding to the previous data in a Galois Field with secret constant factors corresponding to the previous data blocks;
performing an exclusive-or of first resulting products of the multiplying the previous data blocks with the previous aggregate GHASH to generate an incremental GHASH;
multiplying the first data blocks in the Galois Field with the secret constant factors specific to each of the first data blocks; and
performing an exclusive-or of second resulting products of the multiplying the first data blocks with the incremental GHASH to generate the aggregate GHASH.

19. The non-transitory computer-readable storage medium of claim 13, wherein encrypting the aggregate GHASH comprising applying a block cipher and a secret blinding key.

20. A method comprising:
generating, by a controller comprising hardware circuitry, a metadata block corresponding to a memory line, the metadata block comprising an error correction code for the memory line and at least one metadata bit;

generating an aggregate GHASH corresponding to a region of memory comprising a cacheline set comprising at least the memory line;

encrypting the aggregate GHASH as an aggregate message authentication code (AMAC); and providing the AMAC, encoded versions of first data blocks, and an encoded version of the metadata block for storage on a memory module comprising the memory line.

21. The method of claim 20, wherein the region of memory corresponds to at least one of an entire set of memory devices in the memory module or an individual memory device in the memory module.

22. The method of claim 20, wherein the AMAC is used for integrity verification purposes in response to a full device failure of a memory device in the memory module, and wherein the AMAC represents a total integrity of a number of memory lines and is used to re-total an associated set of memory lines of the memory module and to verify lost device data was correctly recovered.

23. The method of claim 20, wherein generating the aggregate GHASH further comprises:

recovering a previous aggregate GHASH from a previous AMAC;

retrieving previous data for the memory line;

multiplying previous data blocks corresponding to the previous data in a Galois Field with secret constant factors corresponding to the previous data blocks;

performing an exclusive-or of first resulting products of the multiplying the previous data blocks with the previous aggregate GHASH to generate an incremental GHASH;

multiplying the first data blocks in the Galois Field with the secret constant factors specific to each of the first data blocks; and performing an exclusive-or of second resulting products of the multiplying the first data blocks with the incremental GHASH to generate the aggregate GHASH.

24. The method of claim 20, further comprising:

identifying a first plurality of AMAC values comprising at least the AMAC, wherein the first plurality of AMAC values computed on data blocks of a second plurality of memory regions;

determining that there is one failing integrity test in response to verifying an integrity of each of the second plurality of memory regions using the first plurality of AMAC values;

identifying a target AMAC value of the first plurality of AMAC values and a memory region corresponding to the failing integrity test;

computing, for a third plurality of memory cache lines, a fourth plurality of encoded data blocks correction values;

performing an integrity test for each of the memory cache lines of the third plurality of memory cache lines using a corresponding encoded data block correction value from the fourth plurality of encoded data block correction values; and determining whether there is a full device failure based on results of each of the integrity tests.

25. The method of claim 20, further comprising:

computing, for a first plurality of data bytes stored in the memory module, a second plurality of AMAC values comprising at least the AMAC, wherein each of the second plurality of AMAC values is computed on the first plurality of data bytes and is computed on a different set of secret parameters;

generating a hypothesis about a presence of bit errors in locations of encoded data blocks comprising the first plurality of data bytes;

generating bit-linear equations based on the generated hypothesis, wherein a number of unknowns in the bit-linear equations is equal to a number of the bit-linear equations;

solving the bit-linear equations to determine values of the unknowns;

performing an entropy test on the determined values of the unknowns; and in response to determining that the values of the unknowns satisfies the entropy test, correcting the bit errors and verify integrity of corrected bit errors using the second plurality of AMAC values.

* * * * *